(12) United States Patent
Wakaki et al.

(10) Patent No.: US 8,639,518 B2
(45) Date of Patent: Jan. 28, 2014

(54) INFORMATION RETRIEVING APPARATUS, INFORMATION RETRIEVING METHOD, AND COMPUTER PROGRAM PRODUCT

(75) Inventors: Hiromi Wakaki, Tokyo (JP); Kazuo Sumita, Kanagawa (JP); Hiroko Fujii, Tokyo (JP); Masaru Suzuki, Kanagawa (JP); Michiaki Ariga, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/540,048

(22) Filed: Jul. 2, 2012

(65) Prior Publication Data
US 2013/0006616 A1 Jan. 3, 2013

Related U.S. Application Data

(63) Continuation of application No. PCT/JP2010/050069, filed on Jan. 6, 2010.

(51) Int. Cl.
G10L 21/00 (2013.01)
G10L 11/00 (2006.01)
G10L 15/00 (2013.01)

(52) U.S. Cl.
USPC ........ 704/275; 704/271; 704/270.1; 704/270; 704/251; 704/231

(58) Field of Classification Search
USPC .............. 704/271–274, 231, 235, 275, 270.1, 704/270, 251, 200
See application file for complete search history.

(56) References Cited

U.S. PATENT DOCUMENTS 6,532,447 B1 3/2003 Christensson
6,792,291 B1 * 9/2004 Topol et al. ............. 455/564
7,406,421 B2 * 7/2008 Odinak et al. ............. 704/275
7,539,576 B2 5/2009 Ohnishi et al.
7,822,613 B2 * 10/2010 Matsubara et al. .......... 704/275

(Continued)

FOREIGN PATENT DOCUMENTS

| JP | 2002-224981 | 8/2002 |
| JP | 2004-302734 | 10/2004 |
| JP | 2006-292596 | 10/2006 |
| JP | 2007-052928 | 3/2007 |

(Continued)

OTHER PUBLICATIONS

International Search Report for International Application No. PCT/JP2010/050069 mailed on Feb. 16, 2010.

(Continued)

*Primary Examiner* — Pierre-Louis Desir
*Assistant Examiner* — Abdelali Serrou
(74) *Attorney, Agent, or Firm* — Turocy & Watson, LLP

(57) ABSTRACT

According to an embodiment, an information retrieving apparatus includes a housing; an input-output unit to perform dialogue processing with a user; a first detecting unit to detect means of transfer which indicates present means of transfer for the user; a second detecting unit to detect a holding status which indicates whether the user is holding the housing; a third detecting unit to detect a talking posture which indicates whether the housing is held near the face of the user; a selecting unit to select, from among a plurality of interaction modes that establish the dialogue processing, an interaction mode according to a combination of the means of transfer, the holding status, and the talking posture; an dialogue manager to control the dialogue processing according to the selected interaction mode; and a information retrieval unit to retrieve information using a keyword that is input during the dialogue processing.

7 Claims, 19 Drawing Sheets

(56) References Cited

U.S. PATENT DOCUMENTS

| | | | |
|---|---|---|---|
| 7,890,863 B2* | 2/2011 | Grant et al. | 715/702 |
| 8,131,322 B2* | 3/2012 | Sethuraman et al. | 455/569.1 |
| 2001/0016500 A1* | 8/2001 | Son et al. | 455/456 |
| 2002/0069071 A1* | 6/2002 | Knockeart et al. | 704/275 |
| 2006/0190168 A1 | 8/2006 | Ohnishi et al. | |
| 2008/0147401 A1* | 6/2008 | Odinak et al. | 704/251 |
| 2008/0255759 A1* | 10/2008 | Abhyanker | 701/209 |
| 2009/0002147 A1* | 1/2009 | Bloebaum et al. | 340/466 |
| 2009/0209293 A1* | 8/2009 | Louch | 455/566 |
| 2009/0215439 A1* | 8/2009 | Hamilton et al. | 455/418 |
| 2009/0298474 A1* | 12/2009 | George | 455/412.2 |
| 2010/0057571 A1* | 3/2010 | Yamamoto et al. | 705/14.58 |
| 2010/0137037 A1* | 6/2010 | Basir | 455/569.1 |
| 2010/0317332 A1* | 12/2010 | Bathiche et al. | 455/418 |
| 2012/0265535 A1* | 10/2012 | Bryant-Rich et al. | 704/270 |

FOREIGN PATENT DOCUMENTS

| | | |
|---|---|---|
| JP | 2007-085950 | 4/2007 |
| JP | 2007-303989 | 11/2007 |
| WO | 0076177 | 12/2000 |
| WO | 2004092679 | 10/2004 |

OTHER PUBLICATIONS

Written Opinion for International Application No. PCT/JP2010/050069.

Katsurada et al, Design and Implementation of Multi-Modal Interaction System Using Static/Dynamic Information, Graduate School of Engineering, Toyohashi University of Technology, Jul. 7, 2006, 8 pgs.

Japanese Office Action for Japanese Application No. 2011-548885 mailed on Aug. 13, 2013.

* cited by examiner

FIG.5

| MEANS OF TRANSFER | HOLDING STATUS | TALKING POSTURE | INTERACTION MODE |
|---|---|---|---|
| DRIVING | HOLD | NEAR TO FACE | INTERACTION 1 |
| | | FAR FROM FACE | INTERACTION 2 |
| | UN-HOLD | - | INTERACTION 3 |
| ON A TRAIN | HOLD | NEAR TO FACE | INTERACTION 4 |
| | | FAR FROM FACE | INTERACTION 5 |
| | UN-HOLD | - | SLEEP |
| WALKING | HOLD | NEAR TO FACE | INTERACTION 6 |
| | | FAR FROM FACE | INTERACTION 7 |
| | UN-HOLD | - | SLEEP |

FIG.6A

```
state S0 {
  out: {
    print("WELCOME");
    menu-out("RESTAURANTS", "EVENT SEARCH", "ROAD SEARCH", "RAILWAY SEARCH");
    voice-out("WHAT WOULD YOU LIKE TO CHOOSE FROM RESTAURANTS, EVENTS, ROADS,
              AND RAILWAYS?")/[1,4,6];
    voice-out-loud("WHAT WOULD YOU LIKE TO CHOOSE FROM RESTAURANTS, EVENTS,
                    ROADS, AND RAILWAYS?")/[3];
  }
  input: {
    $I=voice-in-near()/[1,6];
    $I=voice-in-far()/[3];
    $I=pen-in()/[2,4,5,7];
  }
  body: {
    if($I=="RESTAURANTS"){goto S1;}
    if($I=="EVENTS"){goto S2;}
    if($I=="ROADS"){goto S3;}
    if($I=="RAILWAYS"){goto S4;}
  }
}
```

FIG.6B

```
state S1 {
  out: {
    print("WELCOME TO THE RESTAURANT SEARCH.");
    print("WHAT IS YOUR CHOICE OF FOOD?");
    menu-out("JAPANESE FOOD", "FRENCH FOOD", "ITALIAN FOOD",
             "CHINESE FOOD", "CANCEL");
    voice-out("WHAT WOULD YOU LIKE TO CHOOSE FROM JAPANESE FOOD, FRENCH FOOD,
              ITALIAN FOOD, AND CHINESE FOOD?")/[1,4,6];
    voice-out-loud("WHAT WOULD YOU LIKE TO CHOOSE FROM JAPANESE FOOD,
                    FRENCH FOOD, ITALIAN FOOD, AND CHINESE FOOD?")/[3];
  }
  input: {
    $I=voice-in-near()/[1,6];
    $I=voice-in-far()/[3];
    $I=pen-in()/[2,4,5,7];
  }
  body: {
    if($I=="JAPANESE FOOD"){$F="JAPANESE FOOD"; goto S1-1;}
    if($I=="FRENCH FOOD"){$F="FRENCH FOOD"; goto S1-1;}
    if($I=="ITALIAN FOOD"){$F="ITALIAN FOOD"; goto S1-1;}
    if($I=="CHINESE FOOD"){$F="CHINESE FOOD"; goto S1-1;}
    if($I=="RETURN"){goto S0;}
  }
}
```

FIG.6C

```
state S1-1 {
  out: {
    ($N, $L)=restaurant-search($F);
    print($N, "NUMBER OF HITS OBTAINED.");
    menu-out($L(0), $L(1), $L(2), $L(3));
    if($N>3){select("NEXT", "RETURN")};
    voice-out("HOW ABOUT" $L(0), $L(1), $L(2), $L(3))/[1,4,6];
    voice-out=loud("HOW ABOUT" $L(0), $L(1), $L(2), $L(3))/[3];
  }
  input: {
    $I=voice-in-near()/[1,6];
    $I=voice-in-far()/[3];
    $I=pen-in()/[2,4,5,7];
  }
  body: {
    if($I==$L(0)){$A=$L(0); goto S1-3;}
    if($I==$L(1)){$A=$L(1); goto S1-3;}
    if($I==$L(2)){$A=$L(2); goto S1-3;}
    if($I==$L(3)){$A=$L(3); goto S1-3;}
    if($I=="NEXT"){$L=shift($L, 4); $N=$N-4; goto S1-2;}
    if($I=="RETURN"){goto S1;}
  }
}
```

FIG.6D

```
state S1-2 {
  out: {
    menu($L(0), $L(1), $L(2), $L(3));
    if($N>3){menu-out("NEXT", "RETURN")};
    voice-out("THEN, HOW ABOUT" $L(0), $L(1), $L(2), $L(3))/[1,4,6];
    voice-out=loud("THEN, HOW ABOUT" $L(0), $L(1), $L(2), $L(3))/[3];
  }
  input: {
    $I=voice-in-near()/[1,6];
    $I=voice-in-far()/[3];
    $I=pen-in()/[2,4,5,7];
  }
  body: {
    if($I==$L(0)){$A=$L(0); goto S1-3;}
    if($I==$L(1)){$A=$L(1); goto S1-3;}
    if($I==$L(2)){$A=$L(2); goto S1-3;}
    if($I==$L(3)){$A=$L(3); goto S1-3;}
    if($I=="NEXT"){$L=shift($L, 4); $N=$N-4; goto S1-2;}
    if($I=="RETURN"){goto S1;}
  }
}
```

FIG.6E

```
state S1-3 {
  out: {
    print($A);
    voice-out($A)/[1,4,6];
    voice-out-loud($A)/[3];
    menu-out("RETURN")
  }
  input: {
    $I=voice-in-near()/[1,6];
    $I=voice-in-far/[3];
    $I=pen-in/[2,4,5,7];
  }
  body: {
    if($I=="RETURN"){goto S1;}
  }
} state S2 {
  ...
}
```

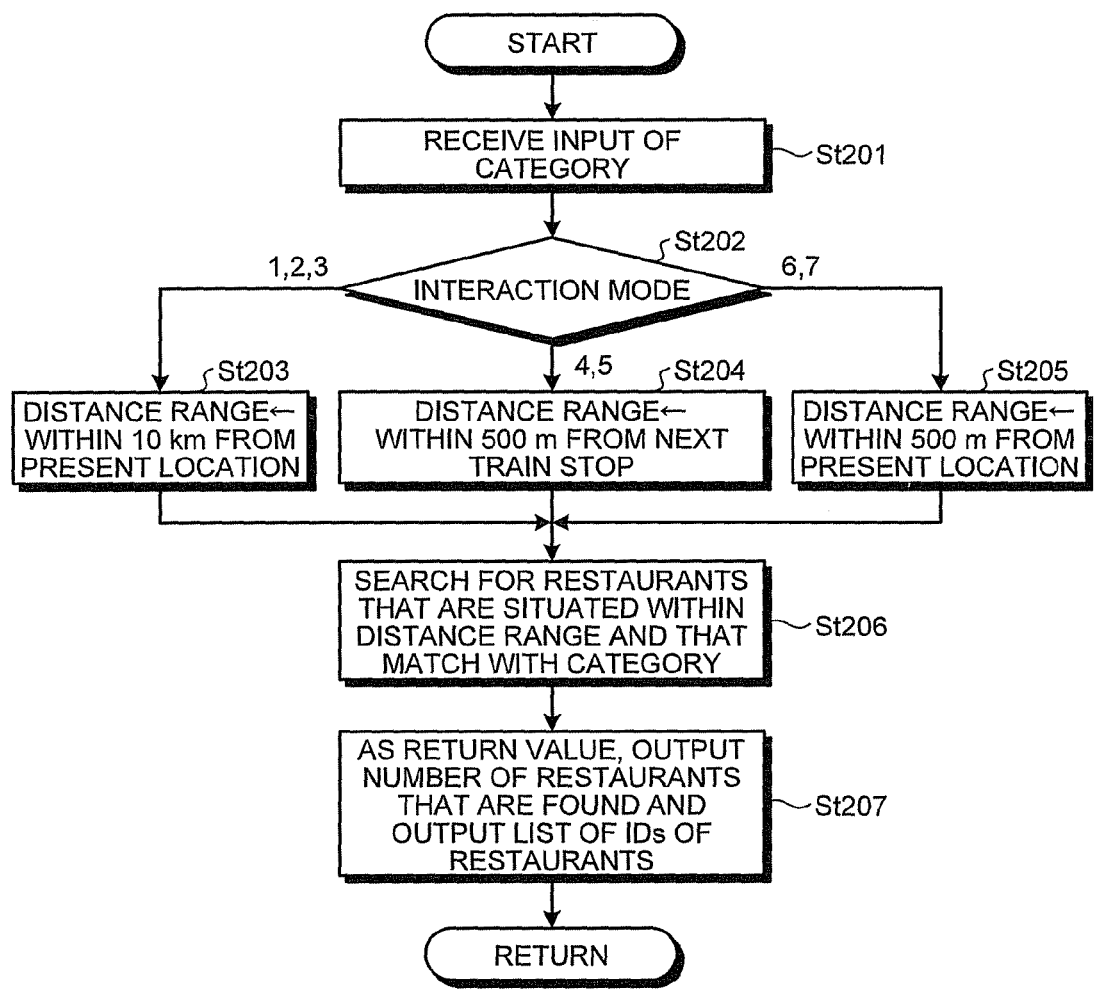

FIG.9A

```
state S1 {
  out: {
    print("WELCOME TO THE RESTAURANT SEARCH.");
    print("WHAT IS YOUR CHOICE OF FOOD?");
    menu-out("JAPANESE FOOD", "FRENCH FOOD", "ITALIAN FOOD",
             "CHINESE FOOD", "CANCEL");
    voice-out("WHAT WOULD YOU LIKE TO CHOOSE FROM JAPANESE FOOD,
             FRENCH FOOD, ITALIAN FOOD, AND CHINESE FOOD?")/[1,4,6];
    voice-out-loud("WHAT WOULD YOU LIKE TO CHOOSE FROM JAPANESE FOOD,
             FRENCH FOOD, ITALIAN FOOD, AND CHINESE FOOD?")/[3];
  }
  input: {
    $I=voice-in-near()/[1,6];
    $I=voice-in-far()/[3];
    $I=pen-in()/[2,4,5,7];
  }
  body: {
    if($I=="JAPANESE FOOD"){$F="JAPANESE FOOD"; goto S1-0;}
    if($I=="FRENCH FOOD"){$F="FRENCH FOOD"; goto S1-0;}
    if($I=="ITALIAN FOOD"){$F="ITALIAN FOOD"; goto S1-0;}
    if($I=="CHINESE FOOD"){$F="CHINESE FOOD"; goto S1-0;}
    if($I=="RETURN"){goto S0;}
  }
}
```

FIG.9B

```
state S1-0 {
  out: {
    print("SEARCHING FOR RESTAURANTS AROUND THE INTENDED STATION")/[4, 5];
    print("WHICH IS YOUR INTENDED EXIT STATION?")/[4, 5];
    voice-out("AT WHICH STATION DO YOU INTEND TO GET OFF?")/[4];
  }
  input: {
    $I=get-present-location()/[1,2,3,6,7];
    $I=pen-in()/[4,5];
  }
  body: {
    if($I=="RETURN"){goto S0;}
    else{$D=$I; goto S1-1;}
  }
}
```

FIG.9C

```
state S1-1 {
  out: {
    ($N, $L)=restaurant-search($F, $D);
    print($N, "NUMBER OF HITS OBTAINED.");
    menu-out($L(0), $L(1), $L(2), $L(3));
    if($N>3){select("NEXT", "RETURN")};
    voice-out("HOW ABOUT" $L(0), $L(1), $L(2), $L(3))/[1,4,6];
    voice-out-loud("HOW ABOUT" $L(0), $L(1), $L(2), $L(3))/[3];
  }
  input: {
    $I=voice-in-near()/[1,6];
    $I=voice-in-far()/[3];
    $I=pen-in()/[2,4,5,7];
  }
  body: {
    if($I==$L(0)){$A=$L(0); goto S1-3;}
    if($I==$L(1)){$A=$L(1); goto S1-3;}
    if($I==$L(2)){$A=$L(2); goto S1-3;}
    if($I==$L(3)){$A=$L(3); goto S1-3;}
    if($I=="NEXT"){$L=shift($L, 4); $N=$N-4; goto S1-2;}
    if($I=="RETURN"){goto S1;}
  }
}
```

FIG.11A

```
state S1 {
  out: {
    print("WELCOME TO THE RESTAURANT SEARCH.");
    print("WHAT IS YOUR CHOICE OF FOOD?");
    menu-out("JAPANESE FOOD", "FRENCH FOOD", "ITALIAN FOOD",
            "CHINESE FOOD", "CANCEL");
    voice-out("WHAT WOULD YOU LIKE TO CHOOSE FROM JAPANESE FOOD,
            FRENCH FOOD, ITALIAN FOOD, AND CHINESE FOOD?")/[1,4,6];
    voice-out-loud("WHAT WOULD YOU LIKE TO CHOOSE FROM JAPANESE FOOD,
            FRENCH FOOD, ITALIAN FOOD, AND CHINESE FOOD?")/[3];
  }
  input: {
    $I=voice-in-near()/[1,6];
    $I=voice-in-far()/[3];
    $I=pen-in()/[2,4,5,7];
  }
  body: {
    if($I=="JAPANESE FOOD"){$F="JAPANESE FOOD"; goto S1-0;}
    if($I=="FRENCH FOOD"){$F="FRENCH FOOD"; goto S1-0;}
    if($I=="ITALIAN FOOD"){$F="ITALIAN FOOD"; goto S1-0;}
    if($I=="CHINESE FOOD"){$F="CHINESE FOOD"; goto S1-0;}
    if($I=="RETURN"){goto S0;}
  }
}
```

FIG.11B

```
state S1-0 {
  out: {
    print("WHICH AREA ARE YOU INTERESTED IN?");
    menu-out("INTERESTED AREA", "PRESENT LOCATION", "CANCEL",);
    voice-out("WHICH AREA ARE YOU INTERESTED IN? OR IS THE PRESENT LOCATION
            TO YOUR LIKING?")/[1,4,6];
    voice-out-loud("WHICH AREA ARE YOU INTERESTED IN? OR IS THE PRESENT
            LOCATION TO YOUR LIKING?")/[3];
  }
  input: {
    $I=voice-in-near()/[1,6];
    $I=voice-in-far()/[3];
    $I=pen-in()/[2,4,5,7];
  }
  body: {
    $M=get-mode();
    if($I=="CANCEL"){goto S0;}
    if($M==Driving()){$W=10000; $D=$I; goto S1-1;}
    if($M==On a train()){$W=500; $D=$I; goto S1-1;}
    if($M==Walking()){$W=500; $D=$I; goto S1-1;}
  }
}
```

FIG.11C

```
state S1-1 {
  out: {
    ($N, $L)=restaurant-search($F, $D ,$W);
    print($N, "NUMBER OF HITS OBTAINED.");
    menu-out($L(0), $L(1), $L(2), $L(3));
    if($N>3){select("NEXT", "RETURN")};
    voice-out("HOW ABOUT" $L(0), $L(1), $L(2), $L(3))/[1,4,6];
    voice-out=loud("HOW ABOUT" $L(0), $L(1), $L(2), $L(3))/[3];
  }
  input: {
    $I=voice-in-near()/[1,6];
    $I=voice-in-far()/[3];
    $I=pen-in()/[2,4,5,7];
  }
  body: {
    if($I==$L(0)){$A=$L(0); goto S1-3;}
    if($I==$L(1)){$A=$L(1); goto S1-3;}
    if($I==$L(2)){$A=$L(2); goto S1-3;}
    if($I==$L(3)){$A=$L(3); goto S1-3;}
    if($I=="NEXT"){$L=shift($L, 4); $N=$N-4; goto S1-2;}
    if($I=="RETURN"){goto S1;}
  }
}
```

FIG.14

| MEANS OF TRANSFER | HOLDING STATUS | TALKING POSTURE | WEARING STATUS | INTERACTION MODE |
|---|---|---|---|---|
| DRIVING | HOLD | NEAR TO FACE | - | INTERACTION 1 |
| | | FAR FROM FACE | WEARING | INTERACTION 8 |
| | | | NOT WEARING | INTERACTION 2 |
| | UN-HOLD | - | WEARING | INTERACTION 9 |
| | | | NOT WEARING | INTERACTION 3 |
| ON A TRAIN | HOLD | NEAR TO FACE | - | INTERACTION 4 |
| | | FAR FROM FACE | WEARING | INTERACTION 10 |
| | | | NOT WEARING | INTERACTION 5 |
| | UN-HOLD | - | WEARING | INTERACTION 11 |
| | | | NOT WEARING | SLEEP |
| WALKING | HOLD | NEAR TO FACE | - | INTERACTION 6 |
| | | FAR FROM FACE | WEARING | INTERACTION 12 |
| | | | NOT WEARING | INTERACTION 7 |
| | UN-HOLD | - | WEARING | INTERACTION 13 |
| | | | NOT WEARING | SLEEP |

FIG.16

| MEANS OF TRANSFER | HOLDING STATUS | TALKING POSTURE | ACTION STEADINESS | INTERACTION MODE |
|---|---|---|---|---|
| DRIVING | HOLD | NEAR TO FACE | STEADY | INTERACTION 14 |
| | | | UNSTEADY | INTERACTION 15 |
| | | FAR FROM FACE | STEADY | INTERACTION 16 |
| | | | UNSTEADY | INTERACTION 17 |
| | UN-HOLD | - | STEADY | INTERACTION 18 |
| | | | UNSTEADY | INTERACTION 19 |
| ON A TRAIN | HOLD | NEAR TO FACE | STEADY | INTERACTION 20 |
| | | | UNSTEADY | INTERACTION 21 |
| | | FAR FROM FACE | STEADY | INTERACTION 22 |
| | | | UNSTEADY | INTERACTION 23 |
| | UN-HOLD | - | - | SLEEP |
| WALKING | HOLD | NEAR TO FACE | STEADY | INTERACTION 26 |
| | | | UNSTEADY | INTERACTION 27 |
| | | FAR FROM FACE | STEADY | INTERACTION 28 |
| | | | UNSTEADY | INTERACTION 29 |
| | UN-HOLD | - | - | SLEEP |

INFORMATION RETRIEVING APPARATUS, INFORMATION RETRIEVING METHOD, AND COMPUTER PROGRAM PRODUCT

CROSS-REFERENCE TO RELATED APPLICATIONS

This application is a continuation of PCT international application Ser. No. PCT/JP2010/050069 filed on Jan. 6, 2010 which designates the United States; the entire contents of which are incorporated herein by reference.

FIELD

Embodiments described herein relate generally to retrieval of information by means of dialogue processing.

BACKGROUND

In mobile devices such as cellular phones that are equipped with the communication function, it has become common to have a function for retrieving a variety of information stored in a server via the WWW and a function for presenting the retrieved information to the user. Regarding retrieval of information, a technique has become popular in which the search scope is limited by the keywords obtained during the dialogue processing performed between a device and the user, so that it becomes possible to retrieve the information desired by the user in an efficient manner.

Since the user uses a mobile device while carrying it along, various conditions can be envisioned in which the mobile device is used. In the case of performing dialogue processing between a mobile device and the user, it is desirable that the details of dialogue processing are optimized according to the diverse usage conditions of the mobile device. For example, depending on various usage conditions such as what is the means of transfer for the user (car, train, walking, etc.), whether or not the device is held by the user, or whether or not the device is held near the face of the user; the most suitable dialogue processing changes.

Techniques disclosed in Japanese Patent Application Laid-open No. 2006-292596 and Japanese Patent Application Laid-open No. 2004-302734 are known for the purpose of detecting the usage condition of a device and accordingly changing the operation details. In Japanese Patent Application Laid-open No. 2006-292596 is disclosed a technique for a mobile device equipped with the GPS function. According to the technique, the means of transfer for the user is detected by processing GPS signals, and the details of the services that are provided are modified depending on the means of transfer for the user. In Japanese Patent Application Laid-open No. 2004-302734 is disclosed a technique for reading the contact Pattern of the user with respect to a device, and for selecting and executing an application program corresponding to that contact pattern.

However, in the techniques disclosed in Japanese Patent Application Laid-open No. 2006-292596 and Japanese Patent Application Laid-open No. 2004-302734, the usage conditions of a device used by a user are not evaluated in a comprehensive manner. Hence, while performing the dialogue processing with the user, the details of the dialogue processing cannot be optimized according to the usage condition of the device.

BRIEF DESCRIPTION OF THE DRAWINGS

FIG. 5 is a diagram illustrating an example of an interaction mode correspondence table;

FIG. 6A is a diagram illustrating an example of an dialogue script;

FIG. 6B is a diagram illustrating an example of an dialogue script;

FIG. 6C is a diagram illustrating an example of an dialogue script;

FIG. 6D is a diagram illustrating an example of an dialogue script;

FIG. 6E is a diagram illustrating an example of an dialogue script;

FIG. 8 is a flowchart for explaining a sequence of operations performed by a information retrieval unit;

FIG. 9A is a diagram illustrating an example of an dialogue script;

FIG. 9B is a diagram illustrating an example of an dialogue script;

FIG. 9C is a diagram illustrating an example of an dialogue script;

FIG. 11A is a diagram illustrating an example of an dialogue script;

FIG. 11B is a diagram illustrating an example of an dialogue script;

FIG. 11C is a diagram illustrating an example of an dialogue script;

FIG. 14 is a diagram illustrating an example of an interaction mode correspondence table;

FIG. 16 is a diagram illustrating an example of an interaction mode correspondence table.

DETAILED DESCRIPTION

Figure 1:
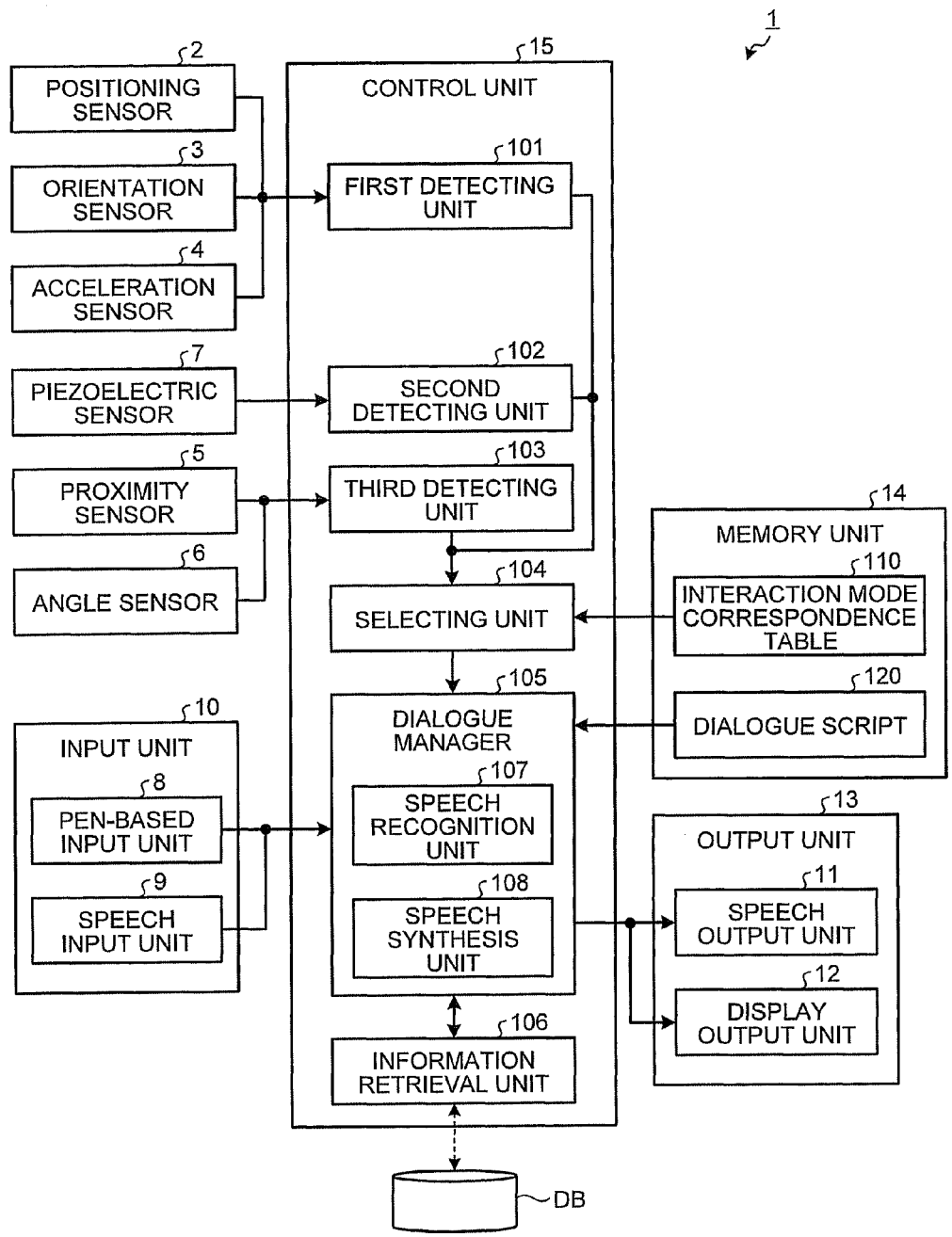
FIG. 1 is a block diagram illustrating a configuration of an information retrieving apparatus according to a first embodiment.

According to an embodiment, an information retrieving apparatus includes a housing; an input-output unit configured to perform dialogue processing with a user; a first detecting unit configured to detect means of transfer which indicates present means of transfer for the user; a second detecting unit configured to detect a holding status which indicates whether or not the user is holding the housing; a third detecting unit configured to detect a talking posture which indicates whether or not the housing is held near the face of the user; a selecting unit configured to select, from among a plurality of interaction modes that establish the dialogue processing, an interaction mode according to a combination of the means of transfer, the holding status, and the talking posture; an dialogue manager configured to control the dialogue processing according to the selected interaction mode; and a information retrieval unit configured to retrieve information using a keyword that is input during the dialogue processing.

Various embodiments are explained below in detail with reference to the accompanying drawings.

In the embodiments explained below, the present invention is applied to a mobile device that is equipped with a function of performing dialogue processing with the user. In order to enable a mobile device to smoothly perform dialogue processing with the user, it is desirable that the details of dialogue processing are optimized according to various usage conditions such as what is the means of transfer for the user (automobile, train, walking, etc.), whether or not the device is held by the user, or whether or not the device is held near the face of the user. For example, while walking, if the user performs a speech input of "restaurants" to a mobile device, then it is desirable that the mobile device searches for restaurants located within the walking distance from the present location. When a plurality of candidate restaurants is found, it is desirable that the mobile device reduces the number of candidates by means of speech dialogue with the user. In another case, while travelling by train, if the user performs a pen-based input of "restaurants" to a mobile device, then it is desirable that the mobile device searches for restaurants situated close to the next train stop. When a plurality of candidate restaurants is found, it is desirable that the mobile device reduces the number of candidates by means of display dialogue with the user.

Meanwhile, consider a case when the user is walking or is travelling by train. There, if the mobile device is held near the face, then it is desirable that speech input-output using a microphone and a speaker is performed. In contrast, if the mobile device is held away from the face, then it is desirable that the input-output operations are performed using pen-based input and display. When the user is travelling by car, depending on whether or not the user is holding the mobile device (herein, holding the mobile device indicates that a high likelihood of a person other than the driver using the mobile device), it is desirable to appropriately switch between the speech input-output using a microphone and a speaker and the input-output using pen-based input and display. Besides, while travelling by car, if the user performs speech input-output without holding the mobile device (for example, by keeping the mobile device in a holder), it is desirable that the speech input level of the microphone as well as the volume level of the speaker is increased as compared to the case of performing speech input-output when the mobile device is held near the face while walking or while travelling by train. Moreover, while travelling by car, if the user performs a speech input of "restaurants" to the mobile device, then it is desirable that the mobile device searches for restaurants located within the driving distance of about 10 minutes from the present location. When a plurality of candidate restaurants is found, it is desirable that the mobile device reduces the number of candidates by means of speech dialogue with the user.

In this way, even in the case of retrieving information regarding the same contents, in order to retrieve the information required by the user in an appropriate manner while performing appropriate dialogue processing with the user, it is desirable to comprehensively evaluate the usage condition of the mobile device; and, depending on the usage condition, it is desirable to optimize the specific control details of the dialogue processing such as selection of input-output units or operation control of input-output units used during the dialogue, determination of details of the information to be output, and selection of the search scope according to the input. The information retrieving apparatus according to the embodiments described below is capable of catering to such needs. That is, the information retrieving apparatus detects the present means of transfer for the user (walking, travelling by car, or travelling by train), detects the holding status (whether or not the mobile device is held in a hand), and detects the talking posture (whether or not the mobile device is held near the face); selects an interaction mode corresponding to the usage condition for the user determined comprehensively from the detection result; and performs the dialogue processing using the selected interaction mode. Hence, even if the user does not explicitly input the usage condition of the mobile device, the information retrieving apparatus can optimize the details of dialogue processing according to the usage condition for the user and can retrieve the information desired by the user in an efficient manner.

First Embodiment

Figure 2:
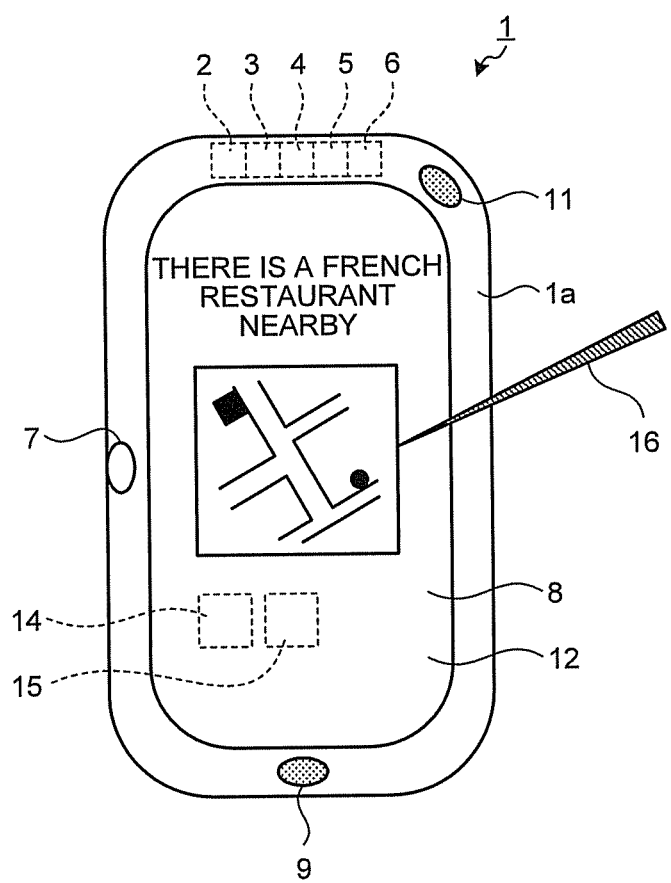
FIG. 2 is a schematic diagram illustrating the external appearance of the information retrieving apparatus according to the first embodiment.

FIG. 1 is a block diagram illustrating a configuration of an information retrieving apparatus 1 according to a first embodiment. FIG. 2 is a schematic diagram illustrating the external appearance of the information retrieving apparatus 1. Herein, the information retrieving apparatus 1 includes various sensors such as a positioning sensor 2, an orientation sensor 3, an acceleration sensor 4, a proximity sensor 5, an angle sensor 6, and a piezoelectric sensor 7; includes an input unit 10 having a pen-based input unit 8 and a speech input unit 9; includes an output unit 13 having a speech output unit 11 and a display output unit 12; includes a memory unit 14; and includes a control unit 15.

As illustrated in FIG. 2, the positioning sensor 2, the orientation sensor 3, the acceleration sensor 4, the proximity sensor 5, and the angle sensor 6 are installed inside a housing 1a of the information retrieving apparatus 1. The positioning sensor 2 measures the absolute location of the information retrieving apparatus 1 (i.e., the present location of the user carrying the information retrieving apparatus 1) with the use of, for example, the GPS, and outputs location information to the control unit 15. The orientation sensor 3 measures the absolute orientation of the information retrieving apparatus 1 (i.e., the orientation of the user carrying the information retrieving apparatus 1) with respect to the geomagnetism with the use of, for example, a magnetoresistance element, and outputs orientation information to the control unit 15. The acceleration sensor 4 measures the rate of acceleration of the information retrieving apparatus 1 with the use of, for example, a piezoresistance element, and outputs acceleration information to the control unit 15. The proximity sensor 5 measures the distance of the information retrieving apparatus 1 from the position of the face of the user by making use of, for example, electromagnetic wave reflection, and outputs distance information to the control unit 15. The angle sensor 6 measures the angle of the information retrieving apparatus 1 by making use of, for example, light or magnetism, and outputs angle information to the control unit 15.

The piezoelectric sensor 7 is a sensor that generates voltage in response to the application of pressure, and is installed in a region such as the periphery of the housing 1a of the information retrieving apparatus 1 that makes contact with the hand of the user while the information retrieving apparatus 1 is being held. When the user holds the information retrieving apparatus 1, the piezoelectric sensor 7 outputs to the control unit 15 a voltage value corresponding to the pressure of holding.

The pen-based input unit 8 is module that receives characters or pictures written by the user on the display output unit 12 using a pen 16 or receives input of pointing information, and outputs input information to the control unit 15. As the pen-based input unit 8, what is called a touch-sensitive display can be used that is configured by applying transparent piezoelectric elements on the screen of a liquid crystal display.

The speech input unit 9 is a module that receives input of the speech uttered by the user, and outputs input information to the control unit 15. The speech input unit 9 is configured with a microphone and an AD converter. Thus, in the speech input unit 9, the microphone takes in the speech signals of the speech uttered by the user and the AD converter performs AD conversion to convert the speech signals into digital signals. Then, the speech input unit 9 outputs the digital speech signals to the control unit 15.

The speech output unit 11 is a module that performs speech output of information to be presented to the user, and is configured with a speaker and a DA converter. Thus, in the speech output unit 11, the DA converter performs DA conversion to convert digital speech signals, which are output as the response speech by the control unit 15, into analog signals, and then the speaker outputs the analog speech signals.

The display output unit 12 is a module that performs display output of information to be presented to the user. As the display output unit 12, a display device such as a liquid crystal display is used that is capable of displaying characters and images.

The memory unit 14 is used to store therein an interaction mode correspondence table 110, which is referred to at the time of selecting an interaction mode for the purpose of controlling the dialogue processing performed by the control unit 15, and is also used to store therein an dialogue script 120 that is referred to at the time of performing the dialogue processing. Meanwhile, in FIG. 1, the example is illustrated in which the memory unit 14, which stores therein the interaction mode correspondence table 110 and the dialogue script 120, is installed outside the control unit 15. However, alternatively, the memory unit 14 can also be used as an internal memory of the control unit 15. In that case, the interaction mode correspondence table 110 and the dialogue script 120 can be stored in the internal memory of the control unit 15. As the memory unit 14, it is possible to use any commonly-used memory medium such as an HDD (Hard Disc Drive), an optical disk, a memory card, or a RAM (Random Access Memory).

The control unit 15 comprehensively controls the operations of the entire information retrieving apparatus 1. For example, the control unit 15 has the configuration of a microcomputer that includes a CPU (Central Processing Unit), a ROM (Read Only Memory), a RAM (Random Access Memory), an input-output interface, and other peripheral devices. In the control unit 15, for example, the CPU uses the RAM as a work area and executes programs stored in the ROM. As a result, as illustrated in FIG. 1, functional components such as a first detecting unit 101, a second detecting unit 102, a third detecting unit 103, a selecting unit 104, an dialogue manager 105, and a information retrieval unit 106 get implemented.

The first detecting unit 101 refers to the information obtained from at least one of the positioning sensor 2, the orientation sensor 3, and the acceleration sensor 4, and detects "means of transfer" of the user carrying the information retrieving apparatus 1. Herein, the means of transfer indicates the present means of transfer for the user. More particularly, the means of transfer indicates whether the present means of transfer for the user is walking, traveling by car, or traveling by train. The operations of the first detecting unit 101 can be implemented by applying a known technique such as the method of using only the position locating means such as the GPS as disclosed in Japanese Patent Application Laid-open No. 2006-292596 or by applying the method of Using an accelerator sensor as mentioned in literature "Iketani Naoki et al., Pedestrian Context Inference Using a 3-Axis Accelerometer, Information Processing Society of Japan, Conference report, Ubiquitous computing System (UBI), Vol. 2008 No. 66, pp. 75-80, July 2008". Thus, the values indicating whether or not there is a large temporal variation in the position of the information retrieving apparatus 1, whether or not there is a large variation in the acceleration of the information retrieving apparatus 1, and whether or not there is a large variation in the orientation of the information retrieving apparatus 1 differ according to the means of transfer ("Walking", "Driving", or "On a train"). Hence, based on the numerical data obtained from the positioning sensor 2, the orientation sensor 3, and the acceleration sensor 4, it becomes possible to detect the means of transfer for the user.

Figure 3A:
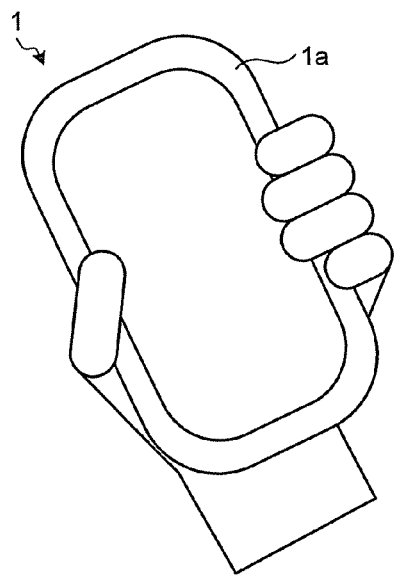
FIGS. 3A and 3B are diagrams for explaining "holding status"
Figure 3B:
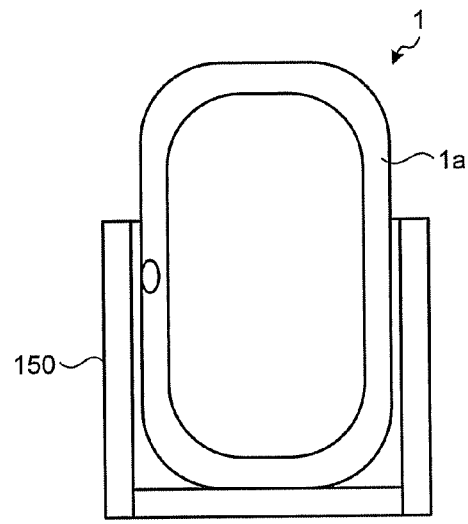

The second detecting unit 102 refers to the information obtained from the piezoelectric sensor 7 and detects "holding status" of the information retrieving apparatus 1 that is held by the user. Herein, the holding status indicates whether or not the user is holding the information retrieving apparatus 1 (the housing 1a), and is binary indicating "Hold" condition, in which the user is holding the housing 1a of the information retrieving apparatus 1 in a hand as illustrated in FIG. 3A, and indicating "Un-hold" condition, in which the information retrieving apparatus 1 is placed in a holder 150 without the user holding it as illustrated in FIG. 3B. As described above, the piezoelectric sensor 7 is installed in a region that makes contact with the hand of the user while the information retrieving apparatus 1 is being held, and outputs a voltage value corresponding to the holding pressure applied by the user. The second detecting unit 102 performs AD conversion of the voltage output by the piezoelectric sensor 7 and compares the voltage value with a predetermined threshold value. If the voltage value of the piezoelectric sensor 7 exceeds the threshold value, the second detecting unit 102 determines that "Hold" condition is true. If the voltage value of the piezoelectric sensor 7 is equal to or smaller than the threshold value, the second detecting unit 102 determines that "Un-hold" condition is true.

Figure 4A:
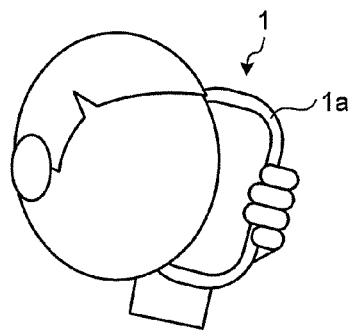
FIGS. 4A and 4B are diagrams for explaining "talking posture"
Figure 4B:
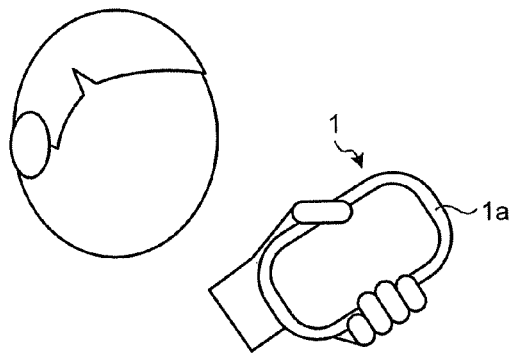

The third detecting unit 103 refers to the information obtained from at least one of the proximity sensor 5 and the angle sensor 6, and detects "talking posture" of the user. Herein, the talking posture indicates whether or not the user is holding the information retrieving apparatus 1 (the housing 1a) near the face, and is binary indicating "Near to face" condition, in which the user is holding the information retrieving apparatus 1 near the face as illustrated in FIG. 4A, and "Far from face" condition, in which the user is holding the information retrieving apparatus 1 far from the face as illustrated in FIG. 4B. When the user attempts to perform speech dialogue using the speech input unit 9 and the speech output unit 11 of the information retrieving apparatus 1; the angle of the information retrieving apparatus 1 changes, as well as the output from the angle sensor 6 and the proximity sensor 5 changes due to the fact that the information retrieving apparatus 1 is moved near the face of the user. Based on the numeral data obtained from the angle sensor 6 and the proximity sensor 5, the third detecting unit 103 determines whether "Near to face" condition is true or "Far from face" condition is true.

The selecting unit 104 refers to the interaction mode correspondence table 110 stored in the memory unit 14, and, of a plurality of interaction modes specified in the interaction mode correspondence table 110, selects an interaction mode set in advance corresponding to a combination of the means of transfer detected by the first detecting unit 101, the holding status detected by the second detecting unit 102, and the talking posture detected by the third detecting unit 103. Herein, an interaction mode is a mode for setting the pattern of dialogue processing performed with the user through the input unit 10 and the output unit 13. Herein, a plurality of interaction modes is established corresponding to a plurality of patterns of dialogue processing that differ according to the usage conditions of the information retrieving apparatus 1 used by the user. Thus, according to the pattern of dialogue processing that is established as per the interaction mode selected by the selecting unit 104, the dialogue manager 105 controls the dialogue processing with the user while selecting the most suitable input unit 10 and the most suitable output unit 13, interpreting the input details, and modifying the information details to be presented to the user in such a way that the most suitable dialogue processing is carried out according to the usage condition of the information retrieving apparatus 1 used by the user. More particularly, for example, if the means of transfer indicates "Walking", then it is desirable that the search scope for searching the search target is set by considering the travel range covered while walking. If the holding status indicates "Un-hold" condition, then it is desirable that the volume level of speech output is increased. If the talking posture indicates "Far from face" condition, then it is desirable that the display output unit 12 and not the speech output unit 11 is selected as the output unit 13 so as to output characters and images. Thus, as far as the usage conditions of the information retrieving apparatus 1 are concerned that affect the dialogue processing, the interaction modes take into account such usage conditions in a comprehensive manner and not only in a fragmentary manner. By performing the dialogue processing that is most suitable to a particular interaction mode, it becomes possible to carry out the dialogue in a rational manner.

An example of the interaction mode correspondence table 110 that is stored in the memory unit 14 is illustrated in FIG. 5. In the interaction mode correspondence table 110 illustrated in FIG. 5, for example, when the means of transfer indicates "Driving", when the holding status indicates "Hold" condition, and when the talking posture indicates "Near to face" condition; it is indicated that an interaction mode "Dialogue 1" is set corresponding to that combination. Similarly, when the means of transfer indicates "On a train", when the holding status indicates "Hold" condition, and when the talking posture indicates "Far from face" condition; it is indicated that an interaction mode "Dialogue 5" is set corresponding to that combination. Moreover, in the interaction mode correspondence table 110, for a case when the means of transfer indicates either "On a train" or "Walking" and when the holding status indicates "Un-hold" condition, it is indicated that an interaction mode "Sleep" is set. That is because, when the user is either travelling by train or is walking but is not holding the information retrieving apparatus 1, it can be inferred that the user has intentionally aborted the dialogue processing. Hence, in such a situation, the interaction mode "Sleep" is set to pause the dialogue processing.

Once the means of transfer is detected by the first detecting unit 101, the holding status is detected by the second detecting unit 102, and the talking posture is detected by the third detecting unit 103; the selecting unit 104 extracts, from the interaction mode correspondence table 110 illustrated in FIG. 5, an interaction mode corresponding to the detected combination of the means of transfer, the holding status, and the talking posture. Then, to the dialogue manager 105, the selecting unit 104 outputs the selected interaction mode as the interaction mode to be used in the dialogue processing performed by the dialogue manager 105.

According to the interaction mode selected by the selecting unit 104, the dialogue manager 105 controls the dialogue processing performed with the user through the input unit 10 and the output unit 13. Herein, the dialogue manager 105 controls the dialogue processing by following the dialogue script 120 stored in the memory unit 14. In the dialogue script 120 that is stored the memory unit 14, the details of different types of dialogue processing are specified corresponding to a plurality of interaction modes specified in the interaction mode correspondence table 110. The dialogue manager 105 follows the dialogue script 120 stored in the memory unit 14 and, depending on the interaction mode selected by the selecting unit 104, determines whether the pen-based input unit 8 or the speech input unit 9 is to be used as the input unit 10 as well as determines whether the speech output unit 11 or the display output unit 12 is to be used as the output unit 13. Then, while modifying the interpretation of the details input by the user from the input unit 10, the dialogue manager 105 performs the dialogue processing with the user. Meanwhile, the dialogue manager 105 includes a speech recognition unit 107, which translate spoken words into text, and includes a speech synthesis unit 108, which converts normal language text into speech. Thus, as per the requirement, the dialogue manager 105 makes use of the speech recognition unit 107 or the speech synthesis unit 108, and performs the dialogue processing according to the selected interaction mode.

A specific example of the dialogue script 120 that is stored in the memory unit 14 is illustrated in FIG. 6A to FIG. 6E. The dialogue script 120 is the data containing the description regarding the knowledge of transitioning states according to the user input. In the dialogue script 120, the description is given regarding the output to be performed in each state (out), regarding the control of input (input), and regarding the action in response to the input (body). Meanwhile, if "/[X]" is specified at the tail end of a command, it indicates that the particular command is executed only when the interaction mode is "X".

For example, the dialogue script illustrated in FIG. 6A represents the portion in which the details regarding a state S0 (initial state) are described. In the "out" field, firstly, it is described that a sentence "welcome" is displayed on the display output unit 12 and it is described that four items, namely, "restaurants" "event search", "road search", and "railway search" are displayed on the display output unit 12. Moreover, it is described that, when the selecting unit 104 has selected any one of the interaction modes "Dialogue 1", "Dialogue 4", and "Dialogue 6" (i.e., when the talking posture indicates "Near to face" condition), a speech such as "What would you like to choose from restaurants, events, roads, and railways?" is output from the speech output unit 11. Similarly, it is described that, when the selecting unit 104 has selected the interaction mode "Dialogue 3" (i.e., when the means of transfer indicates "Driving") and the holding status indicates "Un-hold" condition, a speech such as "What would you like to choose from restaurants, events, roads, and railways?" is output at an increased volume level from the speech output unit 11.

In the "input" field, it is described that, when the selecting unit 104 has selected the interaction mode "Dialogue 1" or "Dialogue 6", a speech input is received by the speech input unit 9 from a shorter distance with respect to the information retrieving apparatus 1 and the input data is assigned to a variable $I. Moreover, it is described that, when the selecting unit 104 has selected the interaction mode "Dialogue 3", a speech input is received by the speech input unit 9 from afar with respect to the information retrieving apparatus 1 and the input data is assigned to the variable $I. Furthermore, it is described that, when the selecting unit 104 has selected any one of the interaction modes "Dialogue 2", "Dialogue 4", "Dialogue 5", and "Dialogue 7", a pen-based input from the user is received by the pen-based input unit 8 and the input data is assigned to the variable $I.

In the "body" field, it is described that, when the variable $I is assigned with "restaurants", a transition to S1 occurs. Moreover, it is described that, when the variable $I is assigned with "events", a transition to S2 occurs. Furthermore, it is described that, when the variable $I is assigned with "roads", a transition to S3 occurs. Moreover, it is described that, when the variable $I is assigned with "railways", a transition to S4 occurs.

The dialogue script illustrated in FIG. 6B represents the operation details in the state S1. The dialogue script illustrated in FIG. 6C represents the operation details in a state S1-1. The dialogue script illustrated in FIG. 6D represents the operation details in the state S1-2. The dialogue script illustrated in FIG. 6E represents the operation details in the state S1-3. In the dialogue script illustrated in FIG. 6B to FIG. 6E too, in an identical manner to the dialogue script illustrated in FIG. 6A; the description is given regarding the output to be performed (out), the input unit 10 to be used for receiving input (input), and the action to be performed (body).

Figure 7:
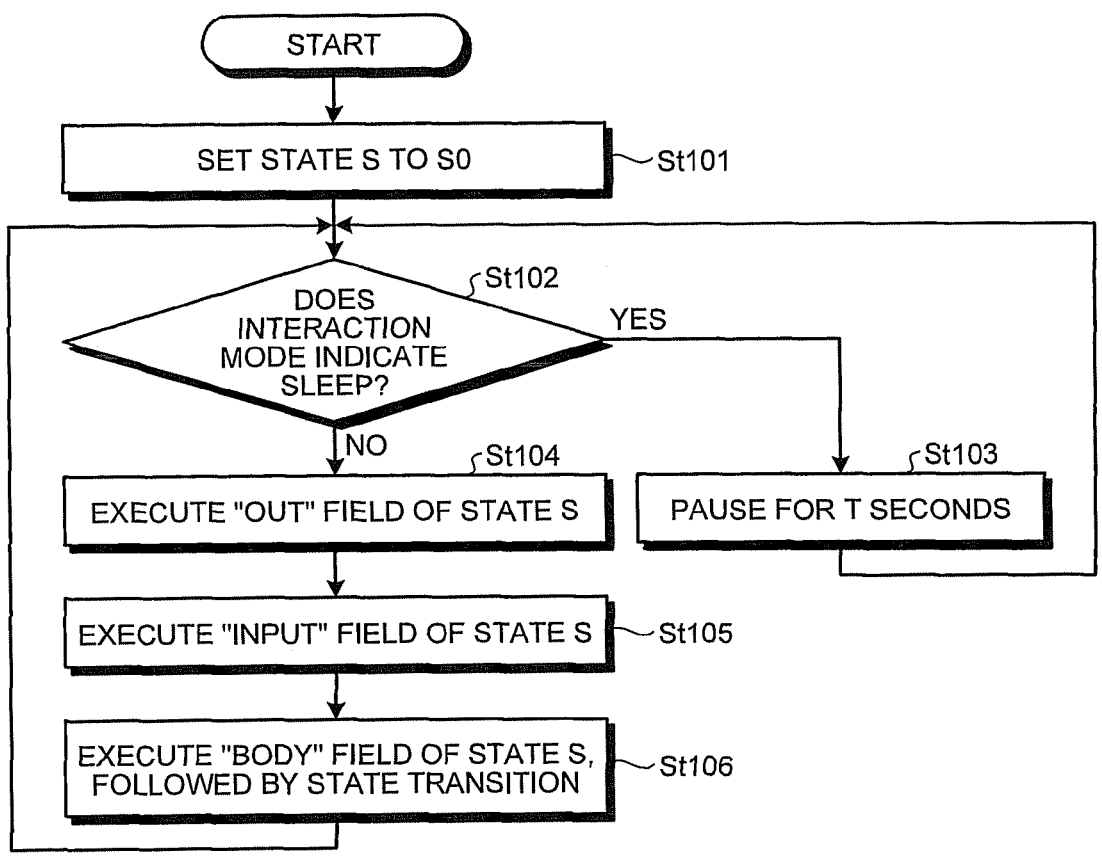
FIG. 7 is a flowchart for explaining a sequence of operations performed by an dialogue manager.

FIG. 7 is a flowchart for explaining a sequence of operations performed by the dialogue manager 105. The operations illustrated in FIG. 7 are performed by the dialogue manager 105 according to the dialogue script illustrated in FIG. 6A to FIG. 6E. Firstly, at Step St101, the dialogue manager 105 sets a state S to the initial state S0. Then, at Step St102, the dialogue manager 105 determines whether or not the selecting unit 104 has selected the interaction mode "Sleep". If the selecting unit 104 has selected the interaction mode "Sleep", then, at Step St103, the dialogue manager 105 pauses the dialogue processing for a predetermined period of time (for T seconds). On the other hand, if the selecting unit 104 has not selected the interaction mode "Sleep", then the system control proceeds to Step St104. Then, at Step St104, the dialogue manager 105 performs the operations described in the "out" field of the dialogue script. Moreover, at Step St105, the dialogue manager 105 performs the operations described in the "input" field. At Step St106, the dialogue manager 105 performs the operations described in the "body" field. Then, transition to the next state S occurs. Subsequently, based on the condition that the interaction mode has not changed to "Sleep", the dialogue manager 105 repeats the operations explained above as long as a target state S for transition is present, and sequentially performs the operations described in the "out" field, the "input" field, and the "body" field for the post-transition state S. Eventually, upon outputting the information desired by the user, the dialogue manager 105 ends the sequence of operations.

The information retrieval unit 106 performs an information retrieving operation using a keyword that is extracted during the dialogue processing performed by the dialogue manager 105 with the user. More particularly, for example, the information retrieval unit 106 is equipped with the function of accessing a database DB, which is maintained on the outside of the information retrieving apparatus 1, via wireless communication. During the dialogue processing, when a search request is issued with a specific search keyword, the information retrieval unit 106 accesses the database DB, obtains information that matches with the search keyword, and sends the obtained information to the dialogue manager 105. Meanwhile, the information retrieving operation performed by the information retrieval unit 106 starts when the dialogue manager 105 executes a command written in the dialogue script 120. For example, when the dialogue manager 105 executes a command "restaurant-search($F)" written in the "out" field of the dialogue script illustrated in FIG. 6C, the information retrieval unit 106 accesses the database DB with "menu category $F" as the search keyword, and obtains the information matching with the search keyword from the database DB.

FIG. 8 is a flowchart for explaining a sequence of operations performed by the information retrieval unit 106 in the case of retrieving information regarding restaurants. Firstly, at Step St201, the information retrieval unit 106 receives the menu category specified by the user during the dialogue processing. Then, at Step St202, the information retrieval unit 106 determines the interaction mode that is selected by the selecting unit 104 from among the interaction modes "Dialogue 1" to "Dialogue 7" specified in the interaction mode correspondence table 110. Herein, if the selecting unit 104 has selected any one of the interaction modes "Dialogue 1" to "Dialogue 3" (i.e., when the means of transfer indicates "Driving"), then, at Step St203, the information retrieval unit 106 sets the target distance range for searching to within 10 km from the present location. Alternatively, if the selecting unit 104 has selected the interaction mode "Dialogue 4" or "Dialogue 5" (i.e., when the means of transfer indicates "On a train"), then, at Step St204, the information retrieval unit 106 sets the target distance range for searching to within 500 m from the next train stop. Still alternatively, if the selecting unit 104 has selected the interaction mode "Dialogue 6" or "Dialogue 7" (i.e., when the means of transfer indicates "Walking"), then, at Step St205, the information retrieval unit 106 sets the target distance range for searching to within 500 m from the present location.

Subsequently, at Step St206, the information retrieval unit 106 accesses the database DB and searches for restaurants that not only are situated within the distance range set at either one of Step St203 to Step St205 but also match with the menu category input at Step St201. Then, at Step St207, the information retrieval unit 106 outputs, as a return value, the number of restaurants found at Step St206 and a list of IDs of those restaurants, and the system control returns. Meanwhile, herein, the explanation is given for an example of retrieving information regarding restaurants. However, regarding other search targets too, the search scope can be narrowed down according to the interaction mode in an identical manner to the example given above. As a result, it becomes possible to retrieve the information desired by the user in an efficient manner. In that case, for example, depending on the search targets such as "restaurants", "events", "roads", "railways", or the like, the search conditions to be specified or the database DB to be referred to are different. Thus, the most suitable operation details corresponding to each search target can be set in advance.

As described above in detail with the specific example, in the information retrieving apparatus 1 according to the first embodiment, the selecting unit 104 selects the interaction mode corresponding to a combination of the means of transfer detected by the first detecting unit 101, the holding status detected by the second detecting unit 102, and the talking posture detected by the third detecting unit 103. Then, according to the pattern of dialogue processing established depending on the selected interaction mode, the dialogue manager 105 controls the dialogue processing performed with the user. Hence, it becomes possible to perform the most suitable dialogue processing depending on the usage condition of the information retrieving apparatus 1 used by the user and to retrieve the information desired by the user in an efficient manner.

First Modification Example

Explained below is a modification example (first modification example) of the information retrieving apparatus 1 according to the first embodiment. In the first modification example, the contents of the dialogue script 120 used by the dialogue manager 105 while performing the dialogue processing with the user are different than the contents in the example given above, and a state S1-0 is added in which location information is obtained for the purpose of narrowing down the search scope. Herein, the configuration of the information retrieving apparatus 1 (see FIG. 1 and FIG. 2), the contents of the interaction mode correspondence table 110 (see FIG. 5), and the sequence of basic operations performed by the dialogue manager 105 (see FIG. 7) are identical to the example given above. Hence, the following explanation is given only regarding the differences with the first embodiment.

An example of the dialogue script 120 according to the first modification example is illustrated in FIG. 9A to FIG. 9C. The transcription script illustrated in FIG. 9A represents the description portion of the operation details regarding a case when the search targets are presented to the user according to the dialogue script for the state S0 (initial state) illustrated in FIG. 6A and when the user inputs "restaurants" as the specific search target. The dialogue script illustrated in FIG. 9A corresponds to the dialogue script illustrated in FIG. 6B. The dialogue script illustrated in FIG. 9B represents the description portion in which the operation details added in the modification example are obtained, that is, the location information for narrowing down the search scope is obtained. The dialogue script illustrated in FIG. 9C represents the portion having the description of the operation details in the state S1-1 to which the transition occurs after the location information is obtained according to the dialogue script illustrated in FIG. 9B. The dialogue script illustrated in FIG. 9C corresponds to the dialogue script illustrated in FIG. 6C.

In the dialogue script illustrated in FIG. 9A, the description regarding the "out" field and regarding the "input" field is identical to the dialogue script illustrated in FIG. 6B. However, in the "body" field, it is described that, when the variable $I is assigned with "Japanese food", then "Japanese food" is assigned to the "menu category $F" followed by the transition to the state S1-0. Moreover, it is described that, when the variable $I is assigned with "French food", then "French food" is assigned to the "menu category $F" followed by the transition to the state S1-0. Furthermore, it is described that, when the variable $I is assigned with "Italian food", then "Italian food" is assigned to the "menu category $F" followed by the transition to the state S1-0. Moreover, it is described that, when the variable $I is assigned with "Chinese food", then "Chinese food" is assigned to the "menu category $F" followed by the transition to the state S1-0. Moreover, it is described that, when the variable $I is assigned with "return", then transition to the state S0 occurs.

In the dialogue script illustrated in FIG. 93, in the "out" field, it is described that, when the selecting unit 104 has selected the interaction mode "Dialogue 4" or "Dialogue 5" (i.e., when the means of transfer indicates "On a train"), a sentence "Searching for restaurants around the intended station" is displayed on the display output unit 12 and a sentence "Which is your intended exit station?" is displayed on the display output unit 12. Moreover, it is described that, when the selecting unit 104 has selected the interaction mode "Dialogue 4" (i.e., when the talking posture indicates "Near to face" condition), a speech such as "At which station do you intend to get off?" is output from the speech output unit 11.

In the "input" field, it is described that, when the selecting unit 104 has selected any one of the interaction modes "Dialogue 1" to "Dialogue 3", "Dialogue 6", and "Dialogue 7", the user is not asked to input the destination and the present location is obtained using "get-present-location( )" in the dialogue manager 105. Moreover, it is described that, when the selecting unit 104 has selected the interaction mode "Dialogue 4", or "Dialogue 5", the pen-based input performed by the user is received by the pen-based input unit 8 and each piece of the obtained data is assigned to the variable $1. Meanwhile, "get-present-location( )" is a command executed in the dialogue manager 105. When the command "get-present-location( )" is issued to the positioning sensor 2, the location information of the present location is sent in reply by the positioning sensor 2.

In the "body" field, it is described that, when the variable $I is assigned with "return", then transition to the state S0 occurs. In all other cases, the contents of the variable $I are assigned to area information $D followed by the transition to the state S1-1.

In the dialogue script illustrated in FIG. 9C, in the "out" field, it is described that an information retrieving operation is performed with respect to the restaurants specified in the area $D and with the "menu category $F" serving as the search keyword, and the result is assigned to a hit count $N and a restaurant ID list $L. In the dialogue script illustrated in FIG. 9C, the description in the "input" field and the "body" field is identical to the dialogue script illustrated in FIG. 6C.

Figure 10:
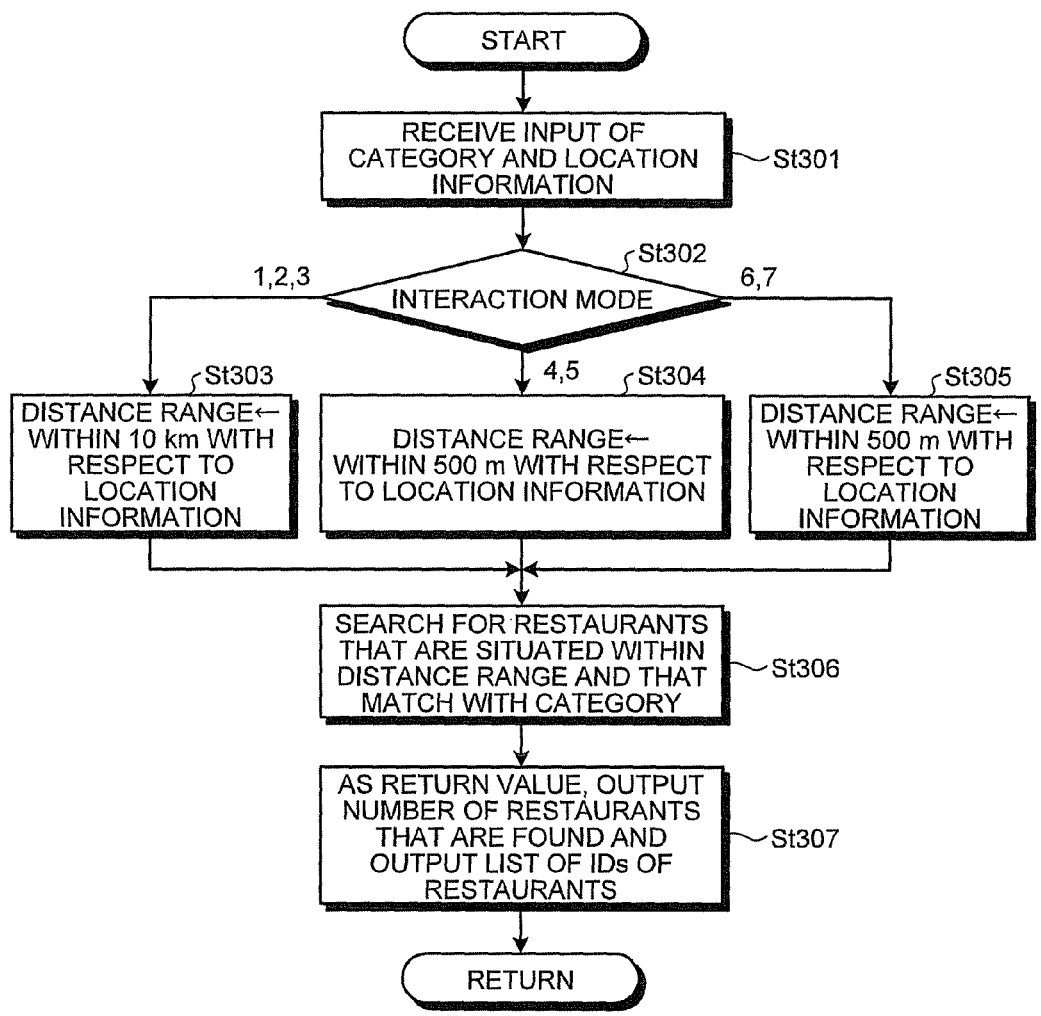
FIG. 10 is a flowchart for explaining a sequence of operations performed by the information retrieval unit.

FIG. 10 is a flowchart for explaining a sequence of operations performed when the information retrieval unit 106 retrieves information regarding restaurants according to the first modification example. The sequence of operations illustrated in FIG. 10 is performed by the information retrieval unit 106 when, for example, the dialogue manager 105 executes a command "restaurant-search($F, $D)" that is written in the "out" field in the dialogue script illustrated in FIG. 9C.

Firstly, at Step St301, the information retrieval unit 106 receives input of the menu category specified by the user during the dialogue processing as well as receives input of the location information such as the station of getting off or the present location specified by the user. Then, at Step St302, the information retrieval unit 106 determines which of the interaction modes "Dialogue 1" to "Dialogue 7", which are specified in the interaction mode correspondence table 110 illustrated in FIG. 5, is selected by the selecting unit 104. If the selecting unit 104 has selected one of the interaction modes "Dialogue 1" to "Dialogue 3" (i.e., when the means of transfer indicates "Driving"), then, at Step St303, the information retrieval unit 106 sets the target distance range for searching to within 10 km from the present location that is received as the location information at Step St301. Alternatively, if the selecting unit 104 has selected the interaction mode "Dialogue 4" or "Dialogue 5" (i.e., when the means of transfer indicates "On a train"), then, at Step St304, the information retrieval unit 106 sets the target distance range for searching to within 500 m from the location that is received as the location information at Step St301. Still alternatively, if the selecting unit 104 has selected the interaction mode "Dialogue 6" or "Dialogue 7" (i.e., when the means of transfer indicates "Walking"), then, at Step St305, the information retrieval unit 106 sets the target distance range for searching to within 500 m from the present location that is received as the location information at Step St301.

Then, at Step St306, the information retrieval unit 106 accesses the database DB and searches for restaurants that not only are situated within the distance range set at either one of Step St303 to Step St305 but also match with the menu category input at Step St301. Then, at Step St307, the information retrieval unit 106 outputs, as a return value, the number of restaurants found at Step St306 and a list of IDs of those restaurants; and the system control returns.

In the first modification example described above, during the dialogue processing performed by the dialogue manager 105 with the user, the location information is obtained that is used in narrowing down the search scope of the information retrieving operation performed by the information retrieval unit 106. As a result, it becomes possible to retrieve the information desired by the user in a more efficient manner.

Second Modification Example

Explained below is another modification example (second modification example) of the information retrieving apparatus 1 according to the first embodiment. Although the second modification example is identical to the first modification example in the fact that the state S1-0 is added to the dialogue script 120 for the purpose of narrowing down the search scope, the operations details described in the state S1-0 are different than the first modification example. That is, in the first modification example, only when the means of transfer is "On a train", the location information is obtained by prompting the user to specify the station of getting off. In any other case, the location information of the present location is obtained. In contrast, in the second modification example, irrespective of the means of transfer, the user is prompted to specify a search target and an area. Moreover, in the first modification example, the distance range for searching is fixed during the information retrieving operation performed by the information retrieval unit 106 and the search scope is determined based on the location information obtained during the dialogue processing performed by the dialogue manager 105. In contrast, in the second modification example, distance ranges corresponding to the means of transfers are stored in the dialogue script 120 so that, during the information retrieving operation performed by the information retrieval unit 106, it becomes unnecessary to modify the operation details depending on different means of transfers and it becomes possible to reduce the processing load during the information retrieving operation.

An example of the dialogue script 120 according to the second modification example is illustrated in FIG. 11A to FIG. 11C. The dialogue script illustrated in FIG. 11A represents the description portion of the operation details regarding a case when the search targets are presented to the user according to the dialogue script in the state S0 (initial state) illustrated in FIG. 6A and when the user inputs "restaurants" as the specific search target. The operation details described in the dialogue script illustrated in FIG. 11A are identical to the operation details described in the dialogue script illustrated in FIG. 9A according to the first modification example. The dialogue script illustrated in FIG. 11B represents the description portion of the characteristic operation details according to the second modification example. That is, the dialogue script illustrated in FIG. 11B represents the description portion of operation details regarding prompting the user to specify an area to be considered as the search target and operation details regarding specifying the distance range corresponding to the means of transfer. The dialogue script illustrated in FIG. 11C represents the description portion of operation details in the state S1-1 to which transition occurs after obtaining the information about the area of search target and obtaining the distance range according to the dialogue script illustrated in FIG. 11B. The dialogue script illustrated in FIG. 11C corresponds to the dialogue script illustrated in FIG. 9C.

In the dialogue script illustrated in FIG. 11B, the description is given for the operation details regarding finalizing the search scope that is performed after the menu category to be searched for is finalized according to the dialogue script illustrated in FIG. 11A. In the "out" field, it is described that a sentence "Which area are you interested in?" is displayed on the display output unit 12 and it is described that a menu containing items "interested area", "present location", "cancel" is displayed on the display output unit 12. Moreover, it is described that, when the selecting unit 104 has selected any one of the interaction modes "Dialogue 1", "Dialogue 4", and "Dialogue 6" (i.e., when the talking posture indicates "Near to face" condition), a speech such as "Which area are you interested in? Or is the present location to your liking?" is output from the speech output unit 11. Moreover, it is described that, when the selecting unit 104 has selected the interaction mode "Dialogue 3" (i.e., when the means of transfer indicates "Driving") and the holding status indicates "Unhold" condition, a speech such as "Which area are you interested in? Or is the present location to your liking?" is output at an increased volume level from the speech output unit 11.

In the "input" field, it is described that, when the selecting unit 104 has selected the interaction mode "Dialogue 1" or "Dialogue 6", a speech input is received by the speech input unit 9 from a shorter distance with respect to the information retrieving apparatus 1 and the input data is assigned to the variable $I. Moreover, it is described that, when the selecting unit 104 has selected the interaction mode "Dialogue 3", a speech input is received by the speech input unit 9 from afar with respect to the information retrieving apparatus 1 and the input data is assigned to the variable $I. Furthermore, it is described that, when the selecting unit 104 has selected any one of the interaction modes "Dialogue 2", "Dialogue 4", "Dialogue 5", and "Dialogue 7", a pen-based input from the user is received by the pen-based input unit 8 and the input data is assigned to the variable $I.

In the "body" field, firstly, it is described that the means of transfer is obtained using "get-mode( )" and is assigned to $M. Moreover, it is described that, when $M is assigned with "Driving", a distance 10000 is assigned to a variable $W that represents the distance range. Furthermore, it is described that, when $M is assigned with "On a train", a distance 500 is assigned to the variable $W. Moreover, it is described that, when $M is assigned with "Walking", a distance 500 is assigned to the variable $W. Furthermore, it is described that, in all these cases, the input in the "input" field is assigned to $D followed by the transition to the state S1-1.

In the dialogue script illustrated in FIG. 11C, in the "out" field, it is described that an information retrieving operation is performed with respect to the restaurants within the distance range $W from the area $D and with the "menu category $F" serving as the search keyword, and the result is assigned to the hit count $N and the restaurant ID list $L. In the dialogue script illustrated in FIG. 11C, the description in the "input" field and the "body" field is identical to the dialogue script illustrated in FIG. 6C and in FIG. 9C.

Figure 12:
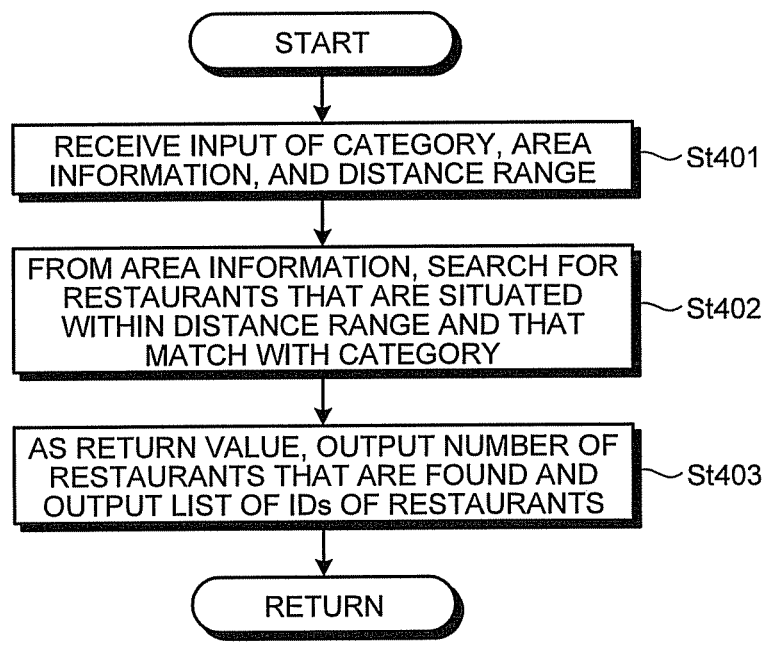
FIG. 12 is a flowchart for explaining a sequence of operations performed by the information retrieval unit.

FIG. 12 is a flowchart for explaining a sequence of operations performed when the information retrieval unit 106 retrieves information regarding restaurants according to the second modification example. The sequence of operations illustrated in FIG. 12 is performed by the information retrieval unit 106 when, for example, the dialogue manager 105 executes a command "restaurant-search($F, $D, $W)" that is written in the "out" field in the dialogue script illustrated in FIG. 11C. Firstly, at Step St401, the information retrieval unit 106 receives input of the menu category specified by the user during the dialogue, receives input of the area information specified by the user, and receives input of the predetermined distance range corresponding to the means of transfer. Then, at Step St402, the information retrieval unit 106 accesses the database DB and searches for the restaurants that are situated in the area input at Step St401, that are situated within the distance range input at Step St401, and that match with the menu category input at Step St401. Subsequently, at Step St403, the information retrieval unit 106 outputs, as a return value, the number of restaurants found at Step St402 and a list of IDs of those restaurants, and the system control returns.

In the second modification example described above, during the dialogue process performed with the user by the dialogue manager 105, the user is prompted to specify the area to be considered as the search target, and the distance range is determined corresponding to the means of transfer. As a result, it becomes possible to retrieve the information desired by the user in a more efficient manner while reducing the processing load during the information retrieving operation performed by the information retrieval unit 106.

Second Embodiment

Figure 13:
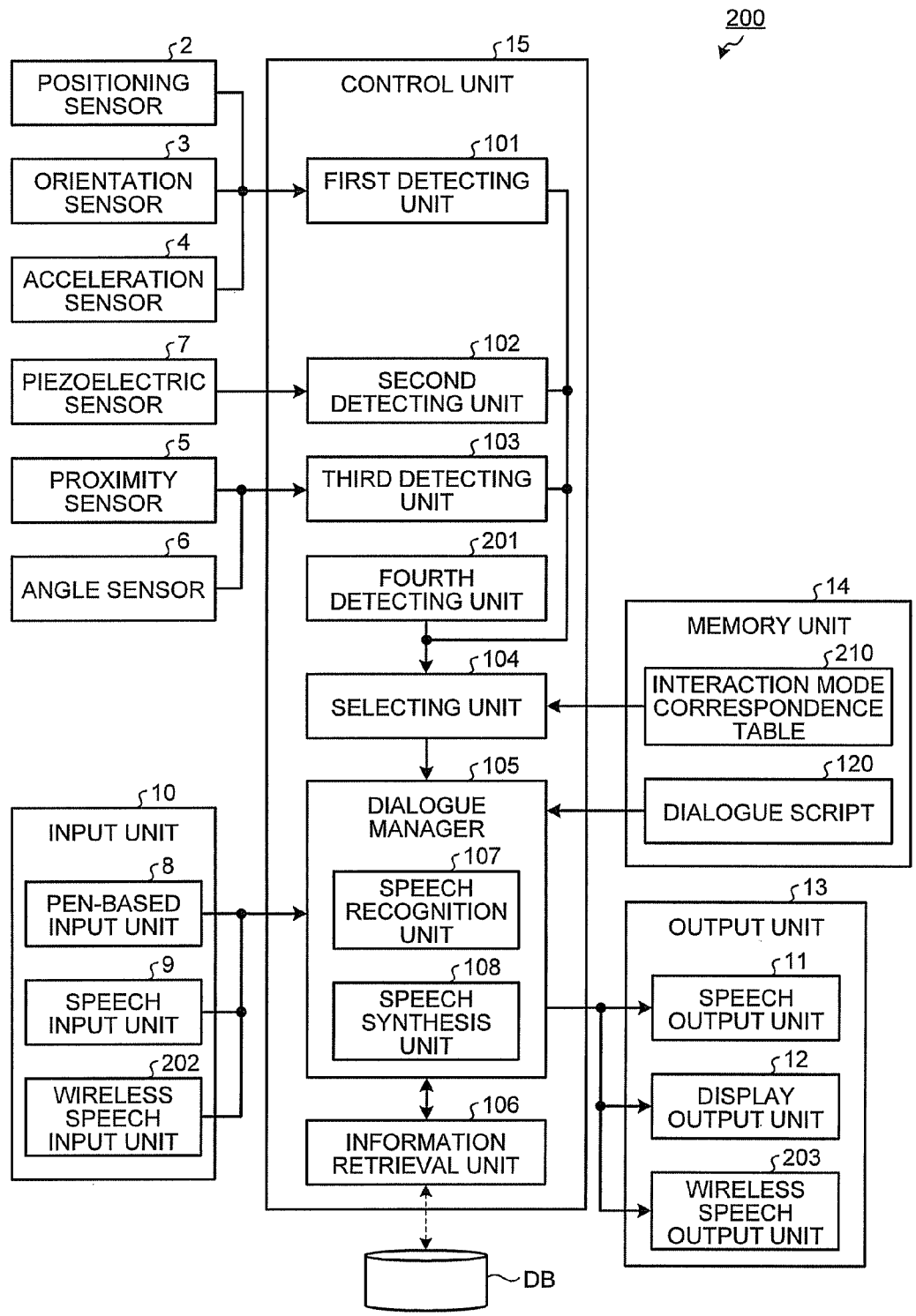
FIG. 13 is a block diagram illustrating a configuration of an information retrieving apparatus according to a second embodiment.

Explained below with reference to FIG. 13 and FIG. 14 is an information retrieving apparatus 200 according to a second embodiment. In addition to detecting "means of transfer", "holding status", and "talking posture" that are explained in the first embodiment, the information retrieving apparatus 200 according to the second embodiment also detects "wearing status" that indicates whether or not the user is wearing a wireless headset, and selects an interaction mode corresponding to the combination of the means of transfer, the holding status, the talking posture, and the wearing status.

FIG. 13 is a block diagram illustrating a configuration of the information retrieving apparatus 200 according to the second embodiment. The information retrieving apparatus 200 according to the second embodiment has almost the same constituent elements as the information retrieving apparatus 1 according to the first embodiment. However, in the functional configuration implemented in the control unit 15, a fourth detecting unit 201 is additionally disposed for the purpose of detecting the wearing status. Moreover, a wireless speech input unit 202 is additionally disposed as the input unit 10, and a wireless speech output unit 203 is additionally disposed as the output unit 13. Meanwhile, in the following description, the configuration that is common with the first embodiment is referred to with the same reference numerals in the drawings and the explanation thereof is not repeated. Thus, the following explanation is given regarding only the differences with the first embodiment.

The wireless speech input unit 202 and the wireless speech output unit 203 are installed inside a wireless headset (not illustrated). In a condition when a wireless communication link is established between the control unit 15 of the information retrieving apparatus 200 and the wireless headset; the wireless speech input unit 202 converts the speech uttered by the user into digital speech signals and input them to the control unit 15, while the wireless speech output unit 203 converts the response signals output by the control unit 15 into analog speech signals and outputs them to the user.

For example, depending on whether or not a wireless communication link is established between the control unit 15 and the wireless headset, the fourth detecting unit 201, which is implemented as part of the functional configuration of the control unit 15, detects the wearing status that indicates whether or not the user is wearing the wireless headset. The wearing status is binary indicating "Wearing" when the user is wearing the wireless headset and indicating "Not wearing" when the user is not wearing the wireless headset.

In the information retrieving apparatus 200 according to the second embodiment, the selecting unit 104 that is implemented as part of the functional configuration of the control unit 15 refers to an interaction mode correspondence table 210 stored in the memory unit 14, and, of a plurality of interaction modes specified in the interaction mode correspondence table 210, selects an interaction mode set in advance corresponding to a combination of the means of transfer detected by the first detecting unit 101, the holding status detected by the second detecting unit 102, the talking posture detected by the third detecting unit 103, and the wearing status detected by the fourth detecting unit 201.

An example of the interaction mode correspondence table 210 that is stored in the memory unit 14 is illustrated in FIG. 14. In the interaction mode correspondence table 210 stored in the memory unit 14, for example, when the means of transfer indicates "Driving", when the holding status indicates "Hold" condition, when the talking posture indicates "Far from face" condition, and when the wearing status indicates "Wearing", it is indicated that an interaction mode "Dialogue 8" is set corresponding to that combination. Similarly, for example, when the means of transfer indicates "Driving", when the holding status indicates "Un-hold" condition, and when the wearing status indicates "Wearing"; it is indicated that an interaction mode "Dialogue 9" is set corresponding to that combination. Once the means of transfer is detected by the first detecting unit 101, the holding status is detected by the second detecting unit 102, the talking posture is detected by the third detecting unit 103, and the wearing status is detected by the fourth detecting unit 201; the selecting unit 104 extracts, from the interaction mode correspondence table 210 illustrated in FIG. 14, an interaction mode corresponding to the detected combination of the means of transfer, the holding status, the talking posture, and the wearing status. Then, to the dialogue manager 105, the selecting unit 104 outputs the selected interaction mode as the interaction mode to be used in the dialogue processing performed by the dialogue manager 105.

Subsequently, as explained in the first embodiment, according to the interaction mode selected by the selecting unit 104, the dialogue manager 105 controls the dialogue processing performed with the user by following the dialogue script 120 stored in the memory unit 14. For example, assume that the selecting unit 104 selects the interaction mode "Dialogue 8" from the interaction mode correspondence table 210 illustrated in FIG. 14. In that case, during the dialogue processing, a speech input is received from the wireless speech input unit 202 and speech information is output from the wireless speech output unit 203. Moreover, in the interaction mode "Dialogue 8", the holding status indicates "Hold" condition. Hence, an input is received also from the pen-based input unit 8. Furthermore, in the interaction mode "Dialogue 8", the talking posture indicates "Far from face" condition. Hence, information is output also from the display output unit 12. Such operation details are described in the dialogue script 120 in a corresponding manner to the interaction modes. Thus, the dialogue manager 105 follows the dialogue script 120 and performs the dialogue processing with the user.

As described above, in the information retrieving apparatus 200 according to the second embodiment, the selecting unit 104 selects an interaction mode corresponding to a combination of the means of transfer detected by the first detecting unit 101, the holding status detected by the second detecting unit 102, the talking posture detected by the third detecting unit 103, and the wearing status detected by the fourth detecting unit 201. According to the interaction mode selected by the selecting unit 104, the dialogue manager 105 controls the dialogue processing performed with the user. Hence, it becomes possible to evaluate in detail the usage condition of the information retrieving apparatus 200 used by the user and to perform the most suitable dialogue processing according to the usage condition of the information retrieving apparatus 200. That makes it possible to retrieve the information desired by the user in a more efficient manner.

Third Embodiment

Figure 15:
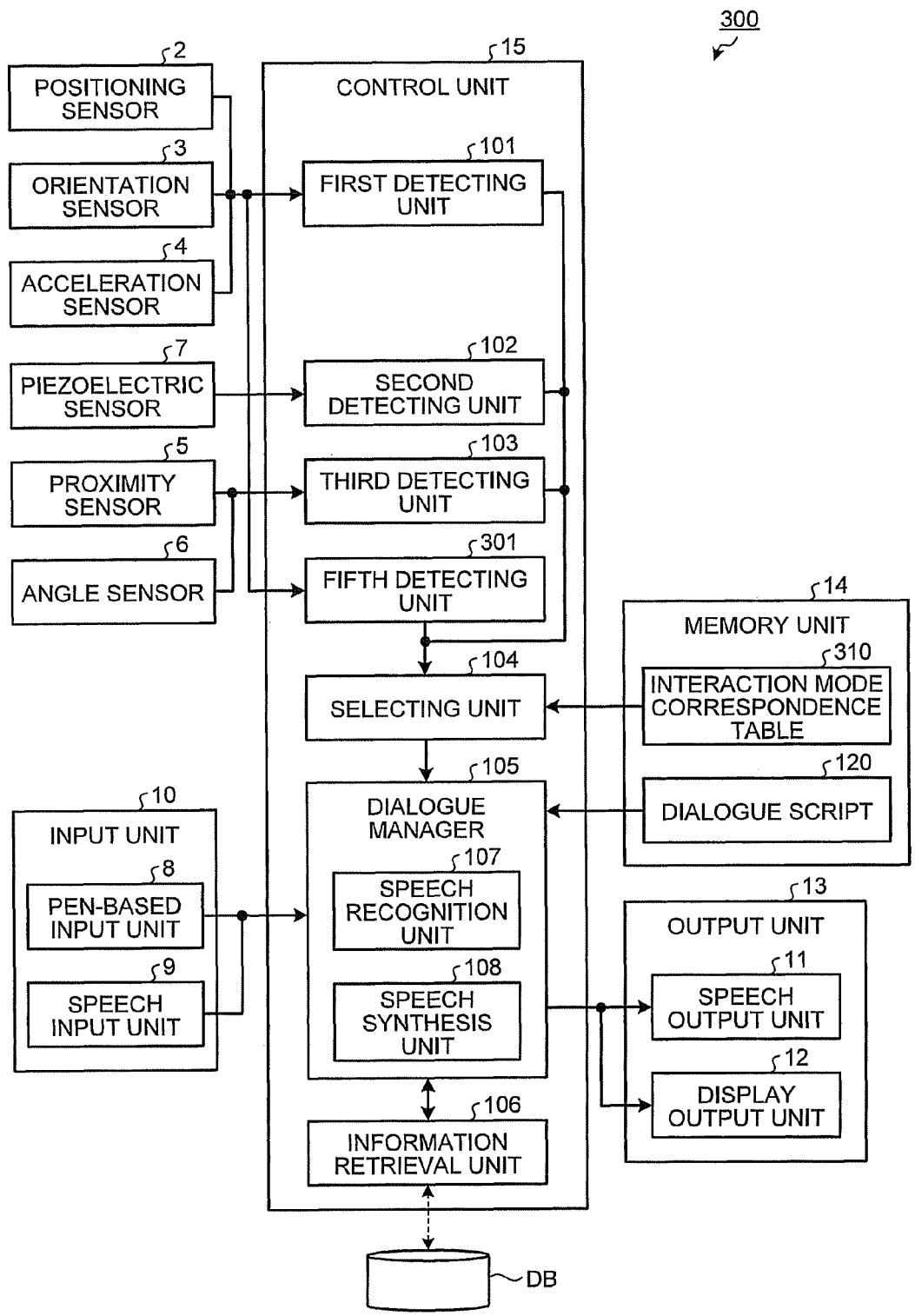
FIG. 15 is a block diagram illustrating a configuration of an information retrieving apparatus according to a third embodiment.

Explained below with reference to FIG. 15 and FIG. 16 is an information retrieving apparatus 300 according to a third embodiment. In addition to detecting "means of transfer", "holding status", and "talking posture" that are explained in the first embodiment, the information retrieving apparatus 300 according to the third embodiment also detects "action steadiness" that indicates whether or not the present action of the user is steady, and selects an interaction mode corresponding to the combination of the means of transfer, the holding status, the talking posture, and the action steadiness.

FIG. 15 is a block diagram illustrating a configuration of the information retrieving apparatus 300 according to the third embodiment. The information retrieving apparatus 300 according to the third embodiment has almost the same constituent elements as the information retrieving apparatus 1 according to the first embodiment. However, in the functional configuration implemented in the control unit 15, a fifth detecting unit 301 is additionally disposed for the purpose of detecting the action steadiness. Meanwhile, in the following description, the configuration that is common with the first embodiment is referred to with the same reference numerals in the drawings and the explanation thereof is not repeated. Thus, the following explanation is given regarding only the differences with the first embodiment.

The fifth detecting unit 301 that is implemented as part of the functional configuration of the control unit 15 refers to the information obtained from at least one of the positioning sensor 2, the orientation sensor 3, and the acceleration sensor 4, and detects the action steadiness that indicates whether or not the present action of the user is steady. Herein, the action steadiness is binary indicating "Steady" when the present action of the user is steady and indicating "Unsteady" when the present action of the user is not steady. Herein, regarding the determination criteria for determining the action steadiness, for example, the determination criteria for a long-term action pattern can be whether the action points to "travelling" or "daily life", while the determination criteria for a short-term action pattern can be whether the action points to "commuting" or "other than commuting". The fifth detecting unit 301 refers to the information obtained from at least one of the positioning sensor 2, the orientation sensor 3, and the acceleration sensor 4, and detects the action steadiness by determining whether the action points to "travelling", "daily life", "commuting", or "other than commuting".

In the information retrieving apparatus 300 according to the third embodiment, the selecting unit 104 that is implemented as part of the functional configuration of the control unit 15 refers to an interaction mode correspondence table 310 stored in the memory unit 14, and, of a plurality of interaction modes specified in the interaction mode correspondence table 210, selects an interaction mode set in advance corresponding to a combination of the means of transfer detected by the first detecting unit 101, the holding status detected by the second detecting unit 102, the talking posture detected by the third detecting unit 103, and the action steadiness detected by the fifth detecting unit 301.

An example of the interaction mode correspondence table 310 that is stored in the memory unit 14 is illustrated in FIG. 16. In the interaction mode correspondence table 310 illustrated in FIG. 16, the interaction mode "Dialogue 1", which is illustrated in the interaction mode correspondence table 110 illustrated in FIG. 5, is divided into two interaction modes "Dialogue 14" and "Dialogue 15" depending on whether the action steadiness indicates "Steady" or "Unsteady". In an identical manner, the interaction mode "Dialogue 2", which is illustrated in the interaction mode correspondence table 110 illustrated in FIG. 5, is divided into two interaction modes "Dialogue 16" and "Dialogue 17". Moreover, the interaction mode "Dialogue 3" is divided into two interaction modes "Dialogue 18" and "Dialogue 19". Furthermore, the interaction mode "Dialogue 4" is divided into two interaction modes "Dialogue 20" and "Dialogue 21". Moreover, the interaction mode "Dialogue 5" is divided into two interaction modes "Dialogue 22" and "Dialogue 23". Furthermore, the interaction mode "Dialogue 6" is divided into two interaction modes "Dialogue 26" and "Dialogue 27". Moreover, the interaction mode "Dialogue 7" is divided into two interaction modes "Dialogue 28" and "Dialogue 29". Once the means of transfer is detected by the first detecting unit 101, the holding status is detected by the second detecting unit 102, the talking posture is detected by the third detecting unit 103, and the action steadiness is detected by the fifth detecting unit 301; the selecting unit 104 extracts, from the interaction mode correspondence table 310 illustrated in FIG. 16, an interaction mode corresponding to the detected combination of the means of transfer, the holding status, the talking posture, and the action steadiness. Then, to the dialogue manager 105, the selecting unit 104 outputs the selected interaction mode as the interaction mode to be used in the dialogue processing performed by the dialogue manager 105.

Subsequently, as explained in the first embodiment, according to the interaction mode selected by the selecting unit 104, the dialogue manager 105 controls the dialogue processing performed with the user by following the dialogue script 120 stored in the memory unit 14. For example, when the selecting unit 104 selects any one of the interaction modes "Dialogue 14", "Dialogue 16", and "Dialogue 18" from the interaction mode correspondence table 310 illustrated in FIG. 16 (i.e., when the means of transfer indicates "Driving" and the action steadiness indicates "Steady"), the dialogue manager 105 follows the description in the dialogue script that is related to searching for restaurants, reads from the history the area that is usually considered as the search target, and uses the speech output unit 11 or the display output unit 12 to ask back the user whether that particular area can be set as the destination. More particularly, for example, the dialogue manager 105 asks the user a question such as "Do you want to search around Ginza?". Meanwhile, when the selecting unit 104 selects the interaction mode "Dialogue 18", the dialogue manager 105 uses the display output unit 12 to display on a screen the other candidate places to which the user often visits.

Meanwhile, when the selecting unit 104 selects the interaction mode "Dialogue 21" or "Dialogue 23" (i.e., when the means of transfer indicates "On a train" and the action steadiness indicates "Unsteady"), the initial output of the state S1 described in the dialogue script 120 is written not corresponding to the common menu categories but corresponding to the menus or ingredients that are famous at the travelled places. More particularly, for example, the user is asked the following question: "Char-grilled local chicken, cheese steamed bread, Miyazaki beef, sweet potato shochu are famous. What would you like to search for?". Moreover, as compared to a steady action, during an unsteady action, there is a high demand for eating delicious or rare food items even if one has to go to far-off places at the destination. By taking into account that fact, the distance range of the area to be considered as the search target can be set to a greater value during an unsteady action than during a steady action.

As described above, in the information retrieving apparatus 300 according to the third embodiment, the selecting unit 104 selects an interaction mode corresponding to a combination of the means of transfer detected by the first detecting unit 101, the holding status detected by the second detecting unit 102, the talking posture detected by the third detecting unit 103, and the action steadiness detected by the fifth detecting unit 301. According to the interaction mode selected by the selecting unit 104, the dialogue manager 105 controls the dialogue processing performed with the user. Hence, it becomes possible to evaluate in detail the usage condition of the information retrieving apparatus 300 used by the user and to perform the most suitable dialogue processing according to the usage condition of the information retrieving apparatus 300. That makes it possible to retrieve the information desired by the user in a more efficient manner.

In the second embodiment described earlier, the explanation is given for an example of obtaining the interaction mode from a combination of the means of transfer, the holding status, the talking posture, and the headset wearing status. In the third embodiment described above, the explanation is given for an example of obtaining the interaction mode from a combination of the means of transfer, the holding status, the talking posture, and the action steadiness. Alternatively, it is also possible to combine the second embodiment and the third embodiment. In that case, the interaction mode can be obtained from a combination of the means of transfer, the holding status, the talking posture, the headset wearing status, and the action steadiness. Moreover, as the information representing an aspect of the usage condition of the device used by the user, it is also possible to additionally detect information other than the information explained in the embodiments described above; and the usage condition of the device used by the user can be evaluated in more detail by combining the various sets of information. In that case too, by adding the corresponding interaction modes in the interaction mode correspondence table, it becomes possible to perform the most suitable dialogue processing according to the usage condition of the device used by the user.

In the information retrieving apparatus according to each embodiment described above, the characteristic functions can be implemented when the control unit 15 executes an information retrieving program. Herein, the information retrieving program executed in the control unit 15 of the information retrieving apparatus is stored in advance in, for example, a ROM of a microcomputer constituting the control unit 15. Alternatively, the information retrieving program executed in the control unit 15 of the information retrieving apparatus can be recorded in the form of an installable or executable file on a computer-readable recording medium such as a CD-ROM, a flexible disk (FD), a CD-R, or a DVD (Digital Versatile Disk). Still alternatively, the information retrieving program executed in the control unit 15 of the information retrieving apparatus can be saved on a computer connected to a network such as the Internet or can be made available for distribution through the network by means of downloading. Still alternatively, the information retrieving program executed in the control unit 15 of the information retrieving apparatus can be distributed over a network such as the Internet.

The information retrieving program executed in the control unit 15 of the information retrieving apparatus according to each embodiment contains modules for each of the above-mentioned constituent elements (the first detecting unit 101, the second detecting unit 102, the third detecting unit 103, the selecting unit 104, the dialogue manager 105, the information retrieval unit 106, the fourth detecting unit 201, and the fifth detecting unit 301). In practice, for example, a CPU (processor) reads the information retrieving program from the ROM mentioned above and runs it such that the information retrieving program is loaded in a main memory device. As a result, the modules for the first detecting unit 101, the second detecting unit 102, the third detecting unit 103, the selecting unit 104, the dialogue manager 105, the information retrieval unit 106, the fourth detecting unit 201, and the fifth detecting unit 301 are generated in the main memory device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information retrieving apparatus comprising:
a housing;
an input-output unit configured to perform dialogue processing with a user;
a first detecting unit configured to detect means of transfer which indicates present means of transfer for the user;
a second detecting unit configured to detect a holding status which indicates whether or not the user is holding the housing;
a third detecting unit configured to detect a talking posture which indicates whether or not the housing is held near the face of the user;
a selecting unit configured to select, from among a plurality of interaction modes that establish the dialogue processing, an interaction mode according to a combination of the means of transfer, the holding status, and the talking posture;
a dialogue manager configured to control the dialogue processing according to the selected interaction mode; and
an information retrieval unit configured to retrieve dialog based information by using a keyword that is input during the dialogue processing and by using a search scope on the dialog based information that is narrowed down according to the selected interaction mode; and
an output unit configured to provide an output to the user based on the retrieved information.

2. The apparatus according to claim 1, wherein the plurality of interaction modes correspond to a plurality of dialogue processing patterns, each of which having at least a different manner of using the input-output unit or different details of information presented to the user.

3. The apparatus according to claim 1, wherein the first detecting unit detects the means of transfer as one of walking, travelling by a car, and travelling by a train.

4. The apparatus according to claim 1, further comprising a fourth detecting unit configured to detect a wearing status which indicates whether or not the user is wearing a wireless headset, wherein
from among the plurality of interaction modes that establish the dialogue processing, the selecting unit selects an interaction mode according to a combination of the means of transfer, the holding status, the talking posture, and the wearing status.

5. The apparatus according to claim 1, further comprising a fifth detecting unit configured to detect an action steadiness which indicates whether or not a present action of the user is steady, wherein
from among the plurality of interaction modes that establish the dialogue processing, the selecting unit selects an interaction mode according to a combination of the means of transfer, the holding status, the talking posture, and the action steadiness.

6. An information retrieving method implemented in an information retrieving apparatus that includes an input-output unit for performing dialogue processing with a user, the information retrieving method comprising:
detecting at least one means of transfer which indicates present means of transfer for the user;
detecting a holding status which indicates whether or not the user is holding the housing;
detecting a talking posture which indicates whether or not the housing is held near the face of the user;
selecting, from among a plurality of interaction modes that establish the dialogue processing, an interaction mode according to a combination of the means of transfer, the holding status, and the talking posture;
controlling the dialogue processing according to the selected interaction mode;
and
retrieving dialog based information by using a keyword that is input during the dialogue processing and by using a search scope on the dialog based information that is narrowed down according to the selected interaction mode; and providing an output to the user based on the retrieved information.

7. A computer program product comprising a non-transitory computer-readable medium containing information retrieving program executed by a computer that includes an input-output unit for performing dialogue processing with a user, the program causing the computer to perform:
detecting at least one means of transfer which indicates present means of transfer for the user;
detecting a holding status which indicates whether or not the user is holding the housing;
detecting a talking posture which indicates whether or not the housing is held near the face of the user;
selecting, from among a plurality of interaction modes that establish the dialogue processing, an interaction mode according to a combination of the means of transfer, the holding status, and the talking posture;
controlling the dialogue processing according to the selected interaction mode; and
retrieving dialog based information by using a keyword that is input during the dialogue processing and by using a search scope on the dialog based information that is narrowed down according to the selected interaction mode; and providing an output to the user based on the retrieved information.

\* \* \* \* \*